US012805420B2

(12) United States Patent
Schaffert

(10) Patent No.: US 12,805,420 B2
(45) Date of Patent: Nov. 24, 2026

(54) FRONT-MOUNTED FOUR-BAR LINKAGE WITH BRACING STRUCTURE

(71) Applicant: SCHAFFERT MANUFACTURING COMPANY, INC., Indianola, NE (US)

(72) Inventor: Paul E. Schaffert, Indianola, NE (US)

(73) Assignee: SCHAFFERT MANUFACTURING COMPANY, INC., Indianola, NE (US)

( * ) Notice: Subject to any disclaimer, the term of this patent is extended or adjusted under 35 U.S.C. 154(b) by 374 days.

(21) Appl. No.: 18/498,788

(22) Filed: Oct. 31, 2023

(65) Prior Publication Data

US 2024/0147886 A1 May 9, 2024

Related U.S. Application Data

(60) Provisional application No. 63/382,337, filed on Nov. 4, 2022.

(51) Int. Cl.

*A01B 63/00* (2006.01)
*A01C 5/06* (2006.01)
*A01C 7/20* (2006.01)

(52) U.S. Cl.

CPC ............ *A01B 63/008* (2013.01); *A01C 5/064* (2013.01); *A01C 7/203* (2013.01); *A01C 7/208* (2013.01)

(58) Field of Classification Search

CPC ....... A01B 63/008; A01C 5/064; A01C 7/203; A01C 7/208

See application file for complete search history.

(56) References Cited

U.S. PATENT DOCUMENTS

| | | | |
|---|---|---|---|
| 13,683 | A | 10/1855 | McCormick |
| 35,510 | A | 6/1862 | De Haven |
| 122,299 | A | 12/1871 | Wight et al. |
| 166,597 | A | 8/1875 | Evans |
| 176,708 | A | 4/1876 | Templin |
| 203,207 | A | 4/1878 | Springer |
| 211,601 | A | 1/1879 | Springer |
| 252,265 | A | 1/1882 | Scofield |
| 288,661 | A | 11/1883 | Purdy et al. |

(Continued)

FOREIGN PATENT DOCUMENTS

| | | | |
|---|---|---|---|
| AU | 2017399124 | A1 | 8/2019 |
| CA | 3052323 | A1 | 8/2018 |

(Continued)

OTHER PUBLICATIONS

Prosecution Document, “U.S. Patent Application as filed,” U.S. Appl. No. 13/428,922, filed Mar. 23, 2012, 136 pages.

(Continued)

*Primary Examiner* — Matthew R Buck
(74) *Attorney, Agent, or Firm* — Dorsey & Whitney LLP

(57) ABSTRACT

A row cleaner assembly for an agricultural planter having a tool bar includes a support frame having a first end attachable to the tool bar and a second end opposite the first end, a parallel linkage secured to the support frame at or near the second end, a row cleaner arm secured to the support frame via the parallel linkage, and a support arm extending rearward from the support frame between the first end and the second end, the support arm configured to fix the support frame to a furrow opener assembly secured to the tool bar and disposed behind the row cleaner assembly.

21 Claims, 12 Drawing Sheets

(56) References Cited

U.S. PATENT DOCUMENTS 308,327 A 11/1884 Runstetler
322,841 A 7/1885 Miskimen
555,897 A 3/1896 Crane
700,109 A 5/1902 Wilkinson
889,947 A 6/1908 Miller
907,278 A 12/1908 Hammonds
909,137 A 1/1909 Bellerive
952,447 A 3/1910 Hammonds
974,247 A 11/1910 Douglass et al.
1,059,534 A 4/1913 Forrest
1,377,073 A 5/1921 Amon
1,473,297 A 11/1923 Knight
1,483,789 A 2/1924 Earhart
1,498,378 A 6/1924 Irwin
2,039,166 A 4/1936 Karl
2,061,694 A 11/1936 Cuddigan
2,401,577 A 6/1946 Melling
2,533,374 A 12/1950 Hyland
2,601,591 A 6/1952 Colombo
2,668,490 A 2/1954 Oehler et al.
2,805,486 A 9/1957 Barrett
2,849,969 A 9/1958 Taylor
2,872,883 A 2/1959 Padrick
2,912,055 A 11/1959 Cornelius et al.
2,991,836 A 7/1961 Le Roy
3,115,192 A 12/1963 Bushmeyer
3,173,498 A 3/1965 Harold
3,177,830 A 4/1965 Zimmerman
3,212,585 A 10/1965 Bezzerides
3,306,371 A 2/1967 Eugene
3,336,885 A 8/1967 Lebow
3,599,729 A 8/1971 Greemore
3,666,572 A 5/1972 Nakagawa et al.
3,734,201 A 5/1973 Zaun
3,895,589 A 7/1975 Garner et al.
4,037,755 A 7/1977 Reuter
4,055,126 A 10/1977 Brown et al.
4,070,974 A 1/1978 Stacy, Jr.
4,108,089 A 8/1978 Van Der Lely
4,148,267 A 4/1979 Bennett et al.
4,253,412 A 3/1981 Hogenson
4,276,836 A 7/1981 Pust
4,294,181 A 10/1981 Smith
4,296,670 A 10/1981 Northup et al.
4,373,455 A 2/1983 Friggstad
4,398,478 A 8/1983 Frase et al.
4,407,207 A 10/1983 Dreyer
4,542,705 A 9/1985 Orth
4,565,141 A 1/1986 Kopecky
4,580,507 A 4/1986 Dreyer et al.
4,607,581 A 8/1986 Kopecky
4,628,841 A 12/1986 Powilleit
4,671,193 A 6/1987 States
4,674,419 A 6/1987 Kopecky
4,744,316 A 5/1988 Lienemann et al.
4,819,737 A 4/1989 Frase
4,834,189 A 5/1989 Peterson et al.
4,858,698 A 8/1989 Williamson et al.
D305,337 S 1/1990 Plummer
4,911,090 A 3/1990 Schimke
5,000,270 A 3/1991 Phillips
5,078,528 A 1/1992 Schmidt
5,092,255 A 3/1992 Long et al.
5,163,518 A 11/1992 Foley
5,341,754 A * 8/1994 Winterton .............. A01C 7/006
111/139
5,361,848 A 11/1994 Fleischer et al.
5,375,542 A 12/1994 Schaffert
5,398,771 A 3/1995 Hornung et al.
5,419,402 A 5/1995 Heintzman
5,425,318 A 6/1995 Keeton
5,443,023 A 8/1995 Carroll
5,461,995 A * 10/1995 Winterton .............. A01C 7/006
111/139
5,497,836 A 3/1996 Groff
5,517,932 A 5/1996 Ott et al.
5,570,746 A 11/1996 Jones et al.
D377,356 S 1/1997 Bruns
5,623,997 A 4/1997 Rawson et al.
5,626,196 A 5/1997 Hughes
5,628,372 A 5/1997 Creyke
5,640,915 A 6/1997 Schaffert
5,645,000 A 7/1997 Carroll
D382,571 S 8/1997 Bruns
5,662,173 A 9/1997 Blesing
5,673,638 A 10/1997 Keeton
D386,191 S 11/1997 Bruns
5,730,074 A 3/1998 Peter
5,732,780 A 3/1998 Nikkel et al.
D395,662 S 6/1998 Bruns
D396,863 S 8/1998 Bruns
D399,215 S 10/1998 Bruns
5,852,982 A 12/1998 Peter
5,884,711 A 3/1999 Shoup
5,896,932 A 4/1999 Bruns et al.
5,904,107 A 5/1999 Kester
5,918,557 A 7/1999 Schaffert
D412,711 S 8/1999 Bruns
5,970,891 A 10/1999 Schlagel
5,996,514 A 12/1999 Arriola et al.
6,082,274 A 7/2000 Peter
6,082,275 A 7/2000 Schaffert
6,119,608 A 9/2000 Peterson et al.
6,148,747 A 11/2000 Deckler et al.
D440,985 S 4/2001 Noonan et al.
6,209,466 B1 4/2001 Wodrich
6,220,191 B1 4/2001 Peter
6,283,050 B1 9/2001 Schaffert
6,314,897 B1 11/2001 Hagny
6,321,667 B1 11/2001 Shoup
6,453,832 B1 9/2002 Schaffert
6,454,019 B1 9/2002 Prairie et al.
6,530,334 B2 3/2003 Hagny
6,640,732 B2 11/2003 Prairie et al.
6,763,773 B2 7/2004 Schaffert
6,918,343 B2 7/2005 Kester
7,121,216 B2 10/2006 Schaffert
7,246,563 B2 7/2007 Kester
7,322,302 B1 1/2008 Reidhar
7,360,495 B1 4/2008 Martin
7,401,561 B1 7/2008 Kurz
7,410,005 B2 8/2008 Lung et al.
7,520,338 B2 4/2009 Stokes
D594,477 S 6/2009 Dawson et al.
7,552,689 B2 6/2009 Schaffert
7,581,503 B2 9/2009 Martin
D611,507 S 3/2010 Martin
7,707,952 B2 5/2010 Schaffert
7,730,961 B2 6/2010 Ward et al.
7,975,629 B1 7/2011 Martin
D648,355 S 11/2011 Lee
8,047,301 B2 11/2011 Friggstad et al.
D663,326 S 7/2012 Allensworth et al.
8,267,021 B2 9/2012 Mariman et al.
8,291,992 B2 10/2012 De Bree
8,291,998 B1 10/2012 Berg et al.
8,333,161 B2 12/2012 Arnett et al.
8,343,291 B1 1/2013 Loen et al.
8,356,563 B2 1/2013 Schaffert et al.
8,359,988 B2 1/2013 Bassett
8,397,612 B2 3/2013 Koplin et al.
8,544,398 B2 10/2013 Bassett
8,555,798 B2 10/2013 Friggstad et al.
D699,267 S 2/2014 Nelson
8,863,857 B2 10/2014 Bassett
8,910,581 B2 12/2014 Bassett
8,910,582 B2 12/2014 Mariman et al.
8,939,095 B2 1/2015 Freed
D727,975 S 4/2015 Brockway
D727,976 S 4/2015 Brockway
9,107,337 B2 * 8/2015 Bassett .................. A01B 71/02
9,204,590 B2 12/2015 Schaffert et al.
9,232,689 B2 1/2016 Trevino et al.
9,365,996 B2 6/2016 Brockway

(56) References Cited

U.S. PATENT DOCUMENTS

| | | | | |
|---|---|---|---|---|
| 9,516,803 | B1 | 12/2016 | Rosenboom | |
| 9,681,599 | B2 | 6/2017 | Whalen et al. | |
| 10,060,467 | B2 | 8/2018 | Schaffert et al. | |
| D844,675 | S | 4/2019 | Schaffert | |
| D849,800 | S | 5/2019 | Hansen et al. | |
| 10,383,274 | B2 | 8/2019 | Whalen et al. | |
| 10,624,252 | B2 | 4/2020 | Nance | |
| D883,345 | S | 5/2020 | Schaffert | |
| 10,798,870 | B2 | 10/2020 | Schaffert et al. | |
| 10,830,274 | B2 | 11/2020 | Schaffert et al. | |
| 10,986,772 | B2 | 4/2021 | Andres | |
| 11,266,063 | B2 | 3/2022 | Schaffert et al. | |
| 11,477,931 | B2 | 10/2022 | Hake et al. | |
| 11,596,094 | B2 | 3/2023 | Hornung | |
| D1,028,042 | S | 5/2024 | Schaffert et al. | |
| 11,980,123 | B2 | 5/2024 | Schaffert et al. | |
| 12,593,743 | B2 | 4/2026 | Schaffert et al. | |
| 12,622,342 | B2 | 5/2026 | Schaffert et al. | |
| 2002/0078869 | A1 | 6/2002 | Brummelhuis | |
| 2003/0051650 | A1 | 3/2003 | Engelke et al. | |
| 2005/0072344 | A1 | 4/2005 | Kester | |
| 2005/0155536 | A1 | 7/2005 | Wendte et al. | |
| 2007/0113763 | A1 | 5/2007 | Schaffert | |
| 2007/0278272 | A1 | 12/2007 | Fast | |
| 2008/0011208 | A1 | 1/2008 | Martin | |
| 2008/0066662 | A1 | 3/2008 | Hesla | |
| 2008/0257237 | A1 | 10/2008 | Friesen et al. | |
| 2008/0303238 | A1 | 12/2008 | Fichter | |
| 2009/0000796 | A1 | 1/2009 | Cooper et al. | |
| 2009/0056962 | A1 | 3/2009 | Martin et al. | |
| 2009/0084295 | A1 | 4/2009 | Schaffert | |
| 2009/0235853 | A1 | 9/2009 | Schaffert | |
| 2010/0059238 | A1 | 3/2010 | Kovach et al. | |
| 2011/0155031 | A1 | 6/2011 | Arnett et al. | |
| 2012/0048160 | A1 | 3/2012 | Adams et al. | |
| 2012/0210919 | A1* | 8/2012 | Van Buskirk .......... | A01B 49/06 111/139 |
| 2012/0210920 | A1 | 8/2012 | Bassett | |
| 2012/0241181 | A1 | 9/2012 | Horsch | |
| 2012/0325133 | A1 | 12/2012 | Whalen et al. | |
| 2013/0074747 | A1 | 3/2013 | Schaffert et al. | |
| 2013/0112121 | A1 | 5/2013 | Achen et al. | |
| 2013/0160684 | A1 | 6/2013 | Whalen et al. | |
| 2013/0263767 | A1 | 10/2013 | Trevino et al. | |
| 2014/0033958 | A1 | 2/2014 | Bassett | |
| 2014/0116735 | A1 | 5/2014 | Bassett | |
| 2014/0262377 | A1* | 9/2014 | Winick ................ | A01B 63/008 172/663 |
| 2015/0075825 | A1 | 3/2015 | Dufty | |
| 2016/0014951 | A1 | 1/2016 | Stark et al. | |
| 2016/0050837 | A1 | 2/2016 | Schaffert et al. | |
| 2016/0106025 | A1 | 4/2016 | Nelson et al. | |
| 2016/0120096 | A1 | 5/2016 | Patwardhan et al. | |
| 2017/0000006 | A1 | 1/2017 | Raetzman et al. | |
| 2017/0208736 | A1 | 7/2017 | Schaffert et al. | |
| 2019/0029165 | A1 | 1/2019 | Leimkuehler et al. | |
| 2019/0271356 | A1 | 9/2019 | Schaffert et al. | |
| 2019/0281756 | A1* | 9/2019 | Sivinski ................. | A01C 7/203 |
| 2019/0364747 | A1 | 12/2019 | Freeman | |
| 2020/0396894 | A1 | 12/2020 | Radtke et al. | |
| 2021/0161063 | A1* | 6/2021 | Schaffert .................. | A01C 7/06 |
| 2021/0168994 | A1 | 6/2021 | Schaffert et al. | |
| 2021/0301863 | A1 | 9/2021 | Schaffert et al. | |
| 2022/0078966 | A1 | 3/2022 | Schaffert et al. | |
| 2022/0240439 | A1 | 8/2022 | Schaffert | |
| 2023/0225240 | A1 | 7/2023 | Schaffert et al. | |
| 2023/0255142 | A1 | 8/2023 | Isaac et al. | |
| 2023/0380333 | A1 | 11/2023 | Schaffert et al. | |
| 2024/0032456 | A1 | 2/2024 | Schaffert et al. | |
| 2024/0057498 | A1 | 2/2024 | Schaffert et al. | |
| 2024/0147883 | A1 | 5/2024 | Schaffert | |
| 2024/0260503 | A1 | 8/2024 | Schaffert et al. | |
| 2026/0060163 | A1 | 3/2026 | Schaffert | |

FOREIGN PATENT DOCUMENTS

| | | | |
|---|---|---|---|
| DE | 3321490 | A1 | 12/1984 |
| DE | 3441610 | A1 | 5/1986 |
| DE | 4235389 | A1 | 3/1994 |
| EP | 2055508 | A2 | 5/2009 |
| EP | 2055509 | A1 | 5/2009 |
| EP | 1964459 | B1 | 12/2011 |
| GB | 2572309 | A | 9/2019 |
| WO | 2018148776 | A1 | 8/2018 |

OTHER PUBLICATIONS

Prosecution Document, "U.S. Patent Application as filed," U.S. Appl. No. 13/646,507, filed Oct. 5, 2012, 126 pages.

Finck, "Where to start with starter fertilizer," Farm Journal, Jan. 1996, pp. 15-16.

Agco, "Tye, Parts Catalog, 2015/2020 Rice and Soybean Drill EFF. S/N K-6-1367-10-RD," Jun. 1996, Form No. 79017760, Litho in U.S.A., 3 pages.

Author Unknown, "Yield-Pro Planters: Yield increasing row spacing options coupled with best in class productivity and accuracy," at least as early as Dec. 21, 2007, 1 page.

Author Unknown, "Yield-Pro Planters: Unsurpassed in form, function and safety," Great Plains, at least as early as Dec. 21, 2007, pp. 4, 5 and 10.

Author Unknown, "1200 Series Advanced Seed Meter Planters," Case lil, 2005, pp. 1-35.

Author Unknown, "3000 Series Kinze Planters," 2003, pp. 3-6 and 12.

Author Unknown, "8000 Series Planters: Simply Advanced," White Planters, 2001, pp. 13-15.

Author Unknown, "Brochure: The Precision Vacuum Planter, NG Plus Series," A.T.I., Inc., Monosem, Lenexa, Kansas, at least as early as Dec. 21, 2007, 10 pages.

Author Unknown, "Changing Planting Depth," at least as early as Dec. 21, 2007, 3 pages.

Author Unknown, "Cost-Effective Solutions for Real-World Needs," Yetter Profitable Solutions, at least as early as Dec. 21, 2007, pp. 1-29.

Author Unknown, "Dawn 1572/1500 Coulter Combo," Jul. 28, 2004, 2 pages.

Author Unknown, "Dawn Curvtine™ Closing Wheel," 1997, 2 pages.

Author Unknown, "Dawn Trashwheels Row Cleaner," at least as early as Dec. 21, 2007, 1 page.

Author Unknown, "Ferti-Placer," Schaffert Manufacturing Co., Inc., at least as early as Dec. 21, 2007, 2 pages.

Author Unknown, "Groff AG Improvements, LLC." at least as early as Dec. 21, 2007, 4 pages.

Author Unknown, "Hawkins Manufacturing Inc . . . " at least as early as 2002, 1 page.

Author Unknown, "Heavy-Duty Coulter." at least as early as Dec. 21, 2007, 3 pages.

Author Unknown, "http://precision_planting.com/html/keeton.html," at least as early as Dec. 30, 2000, 1 page.

Author Unknown, "Keeton Seed Firmer," J & K Enterprises, 1994, 2 pages.

Author Unknown, "Keeton Seed Firmer, Precision Planting," at least as early as Apr. 9, 2001, 4 pages.

Author Unknown, "Photos Labeled 'Photo A' and 'Photo B'," Oct. 17, 2007, 1 page.

Author Unknown, "Planter "N" Forcer, Planter Fertilizer Attachments online product information description," Hawkins Mfg. Inc. Retrieved from http://www.hawkinsmfg.com/ attachments.htm on Dec. 9, 2012, 2 pages.

Author Unknown, "Planter Fertilizer Attachments," Hawkins Manufacturing Inc., at least as early as Dec. 21, 2007, 4 pages.

Author Unknown, "Seed to Soil Inforcer," Seed Flap, Spring 1995, 1 page.

Author Unknown, "Sunco: Effectively Moves Trash in All Conditions!," at least as early as Dec. 21, 2007, 2 pages.

(56) References Cited

OTHER PUBLICATIONS

Author Unknown, "Sunco: Your Solution for Accurate Starter Fertilizer Placement," at least as early as Dec. 21, 2007, 2 pages.
Author Unknown, "Tine-Tooth Row Tillage Attachment." at least as early as Dec. 21, 2007, 9 pages.
Author Unknown, "Tube Alignment Brackets," M & J Cotton Farms, Inc., at least as early as Oct. 30, 1995,1 page.
Author Unknown, "We Know It's All About Strong Roots," Yetter Profitable Solutions, at least as early as Dec. 21, 2007, pp. 1-29.
Schaffert Manufacturing Co, Inc., Brochure entitled "Breaking New Ground with Cutting-Edge Planting 1 Attachments", Mar. 2022, 13 pages.

* cited by examiner

FRONT-MOUNTED FOUR-BAR LINKAGE WITH BRACING STRUCTURE

CROSS-REFERENCE TO RELATED APPLICATIONS

The present application claims priority under 35 U.S.C. § 119 to U.S. Provisional Application No. 63/382,337, filed Nov. 4, 2022, entitled "Front-Mounted Four-Bar Linkage With Bracing Structure," which is hereby incorporated by reference herein in its entirety for all intents and purposes.

FIELD

The technical field relates to agricultural seed planters and drills. More specifically, the technical field relates to parallel linkage-connecting mechanisms between opening assemblies and closing assemblies on planters and drills.

BACKGROUND

Agricultural seed planting is typically accomplished by multi-row planters. Each planter may include multiple row units adapted for clearing debris on the field surface, opening a seed furrow, depositing seeds within the furrow, and closing the seed furrow around the seeds. In some cases, each row unit of the planter may also open a fertilizer furrow adjacent to each seed furrow, deposit liquid fertilizer in each fertilizer furrow, and close each fertilizer furrow.

Some planters are equipped or retrofitted to be equipped with fertilizer depositing equipment (e.g., fertilizer furrow opener discs and fertilizer deposit tubes) located on a leading or front side of the planter. Planters so configured may have problems in fields with moist or wet soil. Specifically, disturbing the soil with the fertilizer equipment located in front of the planter gauge wheels may cause the moist or wet soil to accumulate on the gauge wheels. The soil accumulation increases the effective diameters of the gauge wheels and causes the planter to run too shallow with respect to the depositing of the seed in the seed furrows.

Planters are increasingly used in no-till situations, resulting in the planter traversing fields with substantial deviation in the field surface and a substantial amount of obstructions (e.g., debris, clods, stubble, old furrows, etc.). Furthermore, in certain Midwest farm areas, ditches must be plowed in fields between planting seasons to facilitate the drainage of spring showers from the fields. Most planters have proven ineffective in such rough field surface conditions. It is not unusual for the use of planters in rough field conditions to result in seed depths that radically range between too deep and too shallow. Also, it is not unusual for the use of planters in such field conditions to result in the planter components being damaged.

Furrow opener assemblies rely on guide wheels to roll over and contact a top surface of the soil as an adjacent furrow opener disc digs into the soil to open a furrow. The guide wheel uses the surface of the field as a reference to set the depth of the adjacent opener disc. Row cleaner assemblies may include wheels configured to sweep away debris on the surface of the field ahead of the furrow opener disc and guide wheel. Sweeping away debris may prevent the guide wheel from rolling over the debris and using the debris as a reference for controlling the depth of the furrow. However, typical row cleaner assemblies may be negatively affected by uneven ground where, for example, the row cleaner wheel may encounter a high or low spot on the field surface before the guide wheel. Any variation in the ground level may negatively affect the consistency and effectiveness of traditional row cleaner assemblies clearing debris.

Thus, there is a need in the art for a planter capable of clearing debris in rough fields without adverse impact on seed depth and damage to planter components. There is also a need in the art for a planter capable of effectively clearing debris from in front of the opener and closer assemblies to ensure consistent and effective furrow opening, seed planting, fertilizing, and furrow closing.

SUMMARY

Examples of the present invention are directed to trailing arm assemblies with compact linkage assemblies.

In one example of the present disclosure, a row cleaner assembly for an agricultural planter having a tool bar includes a support frame having a first end attachable to the tool bar and a second end opposite the first end, a parallel linkage secured to the support frame at or near the second end, a row cleaner arm secured to the support frame via the parallel linkage, and a support arm extending rearward from the support frame between the first end and the second end, the support arm configured to fix the support frame to a furrow opener assembly secured to the tool bar and disposed behind the row cleaner assembly.

In one example, the parallel linkage is a first parallel linkage and the furrow opener assembly is fixed to the tool bar via a second parallel linkage. In one example, the second parallel linkage includes a first bracket secured to the tool bar and the support arm is configured to fix the support frame to the first bracket. In one example, the furrow opener assembly includes an opener frame and the second parallel linkage includes a second bracket rotatably secured to the first bracket via parallel links. In one example, the row cleaner arm is attachable to a row cleaner wheel. In one example, the row cleaner arm is attachable to a depth control wheel. In one example, the parallel linkage includes a bracket, a first parallel link rotatably secured to the bracket at a first picot and to the support frame at a second pivot, a second parallel link rotatably secured to the bracket at a third pivot and to the support frame at a fourth pivot, and an adjustable biasing member extending from the first parallel link to the support frame. In one example, the adjustable biasing member includes a first end and a second end opposite the first end, the first end of the adjustable biasing member is secured at or near the first pivot, and the second end of the adjustable biasing member is secured at or near the fourth pivot.

In one example of the present disclosure, a trailing assembly of an agricultural planter includes a first parallel linkage configured to secure a furrow opener assembly behind a tool bar of the agricultural planter and a second parallel linkage configured to secure a row cleaner wheel in front of the planter assembly.

In one example, the trailing assembly further includes a row cleaner assembly having a support frame with a first end attachable to the tool bar and a second end opposite the first end, the second parallel linkage secured to the support frame at or near the second end, and a row cleaner arm secured to the support frame via the second parallel linkage. In one example, the row cleaner arm is configured to rotatably attach to the row cleaner wheel. In one example, the row cleaner arm is configured to rotatably attach to a depth control wheel and the furrow opener assembly includes a furrow opener wheel. In one example, the second parallel linkage is secured to the furrow opener assembly.

In one example of the present disclosure, a trailing assembly includes a first frame attachable to a tool bar of an agricultural planter via a first parallel linkage, a second frame attachable to the first frame via a second parallel linkage, and a third frame attachable to the trailing assembly via a third parallel linkage. In such an example, the second frame is configured to trail behind the first frame and the third frame is configured to lead ahead of the first frame.

In one example, the trailing assembly further includes a support frame attachable to the tool bar and the third parallel linkage is configured to attach the third fame to the support frame. In one example, the third frame is attachable to the first frame via the third parallel linkage. In one example, the trailing assembly further includes a furrow opener assembly secured to the first frame. In one example, the furrow opener assembly includes a furrow opener disc. In one example, the trailing assembly further includes a closer assembly secured to the second frame.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
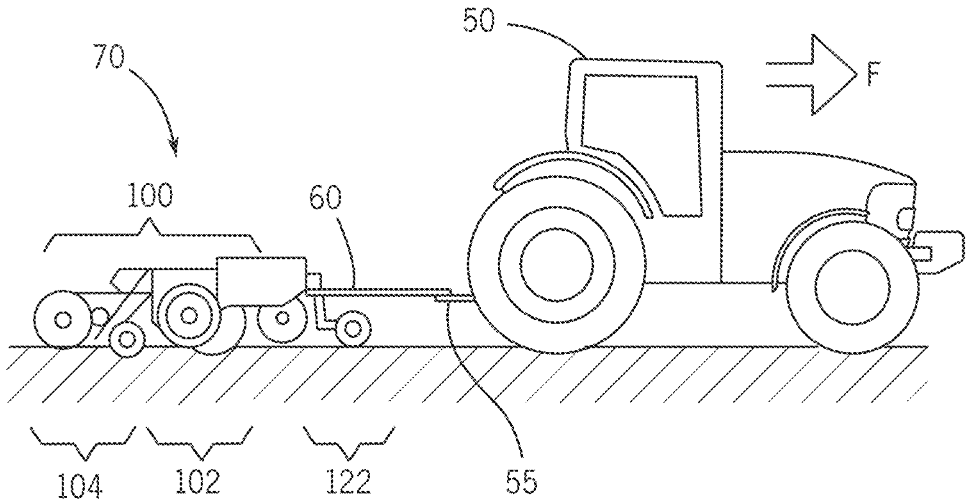
FIG. 1 illustrates a side view of an embodiment of an agricultural tractor pulling a planter assembly.

The description that follows includes sample systems, methods, and apparatuses that embody various elements of the present disclosure. However, it should be understood that the described disclosure may be practiced in a variety of forms in addition to those described herein.

The trailing arm assemblies and agricultural planter components described herein include row cleaner assemblies configured to effectively clear debris ahead of furrow opener and closer assemblies, even over uneven and rough ground. Accordingly, the assemblies of the present disclosure provide improved furrow opening, seed planting, and furrow closing operations unaffected by field debris such as clods, stubble, old furrows.

For example, in at least one embodiment of the present disclosure, a row cleaner assembly for an agricultural planter having a tool bar may include a support frame having a first end attachable to the tool bar and a second end opposite the first end, a parallel linkage secured to the support frame at or near the second end, a row cleaner arm secured to the support frame via the parallel linkage, and a support arm extending rearward from the support frame between the first end and the second end, the support arm configured to fix the support frame to a furrow opener assembly secured to the tool bar and disposed behind the row cleaner assembly. The row cleaner arm may be secured to a row cleaner wheel configured to clear debris from a field surface.

In such an embodiment, the support frame secured to the tool bar secures the row cleaner assembly in front of the other trailing assembly components, including in front of the furrow opener assembly. The row cleaner assembly may be secured to the support frame via the parallel linkage such that the row cleaner assembly, including the row cleaner wheel, may articulate vertically up and down as the field surface varies. In this way, the row cleaner assembly may articulate independently from the furrow opener assembly disposed behind the row cleaner assembly. Thus, when the row cleaner assembly encounters uneven surfaces of the field, the row cleaner wheel may maintain effective contact with the field surface while the guide wheel and furrow opener disc of the opener assembly behind the row cleaner assembly also maintains effective contact with the field surface.

The parallel linkage securing the row cleaner assembly to the support frame may include a down force mechanism to bias the parallel linkage into a position creating a down force of the row cleaner assembly against the field surface. In addition, in some embodiments described herein, the row cleaner assembly is attached directly to the furrow opener assembly, for example to a frame of the furrow opener assembly, via the parallel linkage. In such an embodiment, the row cleaner assembly may still be disposed ahead of the furrow opener assembly as the trailing assembly is pulled in a forward direction.

In this way, the independently articulable row cleaner assembly may maintain contact with the field surface to remove debris ahead of the furrow opener assembly. Then, with the surface free of debris, as the tractor pulls the trailing assembly forward, the guide wheel may make contact with the debris-free soil as a reference to set a consistent depth for the furrow opener disc to form or open the furrow.

Figure 2:
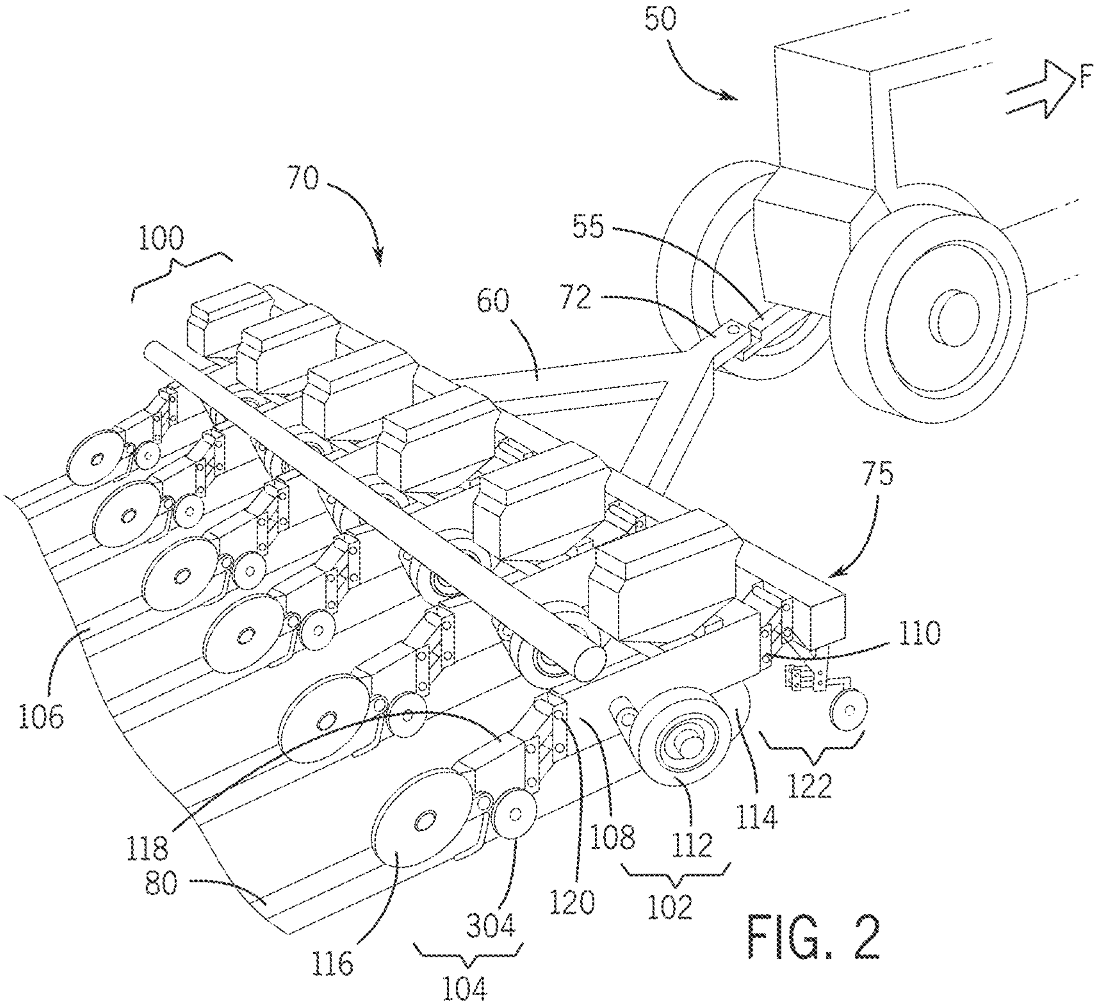
FIG. 2 illustrates a rear, perspective view thereof.

Turning to the Drawings, an exemplary embodiment of an agriculture planter 70 having one or more trailing arm assemblies 100 attached to an agricultural tractor 50 is shown in FIGS. 1 and 2. The linkage assemblies of the present disclosure may be used with the agriculture planter 70 and/or trailing arm assemblies 100, as described herein below. For purposes of illustration, the agricultural tractor 50 may have a hitch receiver 55 extending rearward therefrom. As illustrated in FIG. 2, the planter 70 may include a tool bar 75 from which a yoke or frame 60 with a tongue or hitch 72 extends in a forward direction F. The hitch 72 connects with the hitch receiver 55 to couple the planter 70 to the tractor 50. Various planter components are supported on the tool bar 75 and extend therefrom in a rearward direction (opposite the forward direction F). The tractor 50 tows the planter 70 in the forward direction F indicated by the arrow and provides power to the planter 70 (e.g., via a power take off ("PTO"), not shown) for powering the operations of the planter 70. Additional operations of the planter 70 may be powered by hydraulics or electrical motors (not shown) powered by the tractor 50.

Components of the planter 70 may include a plurality of trailing arm assemblies 100. The trailing arm assemblies 100 may function as row units for planting seeds and distributing liquid fertilizer. Each trailing assembly 100 may be coupled with the tool bar 75 or yoke that extends from the front of the trailing assembly 100. Each trailing assembly 100 may be equipped with a furrow opener assembly 102. Each trailing assembly 100 may also be equipped with a trailing furrow closer assembly 104. As used herein, the term "row unit" may refer to a portion of the trailing assembly 100 configured to open and close a single furrow (e.g., furrow 106). For example, a row unit may include a single furrow opener assembly 102 coupled to and ahead of a single furrow closer assembly 104 to open and close, respectively, the same furrow 106.

In the exemplary embodiment shown, the furrow opener assembly 102 may include an opener assembly frame 108, which may be connected to the tool bar 75 via a parallel linkage 110, such as any of the linkage assemblies or parallel linkages described herein. The parallel linkage 110 allows the furrow opener assembly 102 and the furrow closer assembly 104 to move/translate up and down vertically (generally orthogonal to forward direction F) to follow the terrain (e.g., contours of the field), overcome obstacles (e.g., debris or the like), or otherwise negotiate similar changes in a surface 80 of a field. The furrow opener assembly 102 may include a guide wheel 112 and an opener disc 114, among other components. The furrow closer assembly 104 may include one or more closer wheels 116. In some embodiments, the furrow closer assembly 104 may further include a separate fertilizer opener wheel and a fertilizer dispenser. The vertical movement provided by the linkage may allow the trailing arm assemblies 100 to follow or translate up and down as the opener discs 114 and closer wheels 116 negotiate over or through an obstruction in a field surface 80 without adversely impacting seed deposit depth or resulting in damage to the components of the agricultural planter 70.

Because the trailing arm assemblies 100 are able to adjust to the contours of and variances in the field surface 80 through vertical translation via the parallel linkage 110, the opener discs 114 may be in generally consistent contact with the field surface 80, which may improve opening of furrows 106. Similarly, the trailing furrow closer wheels 116 may be in consistent contact with the field surface 80, which improves closing of the seed and fertilizer furrows 106.

The furrow opener assembly 102 may be coupled to the tool bar 75 via a connection that allows the trailing assembly 100 to move relative to the tool bar 75. In any of the examples contemplated herein, the connection may be configured to maintain an approximately constant relative orientation between the furrow opener assembly 102 and the tool bar 75 through the range of motion of the trailing assembly 100. For example, the furrow opener assembly 102 may connect to the tool bar 75 via the parallel linkage 110. In any of the examples disclosed herein, the parallel linkage 110 may include a pair of linkages that are generally arranged along a central longitudinal plane of the row unit.

The furrow closer assembly 104 may be coupled to the furrow opener assembly 102, for example to the opener frame 108, via a connection that allows the furrow closer assembly 104 to move relative to the furrow opener assembly 104. In any of the examples described herein, the connection may be configured to maintain an approximately constant relative orientation between the furrow closer assembly 104 and the furrow opener assembly 102 through the range of motion of the furrow closer assembly 104. For example, the furrow closer assembly 104 may include a closer assembly frame 118, which may be connected to the furrow opener assembly 102, for example to the opener frame 108, via a parallel linkage 120, such as any of the linkage assemblies described herein. In any of the examples contemplated herein, the parallel linkage 120 may include at least a pair of linkages that are generally arranged along a central longitudinal plane of the row unit.

At least one embodiment of the trailing assembly includes a leading assembly 122. The leading assembly 122 may be a third assembly in addition to the first furrow opener assembly 102 and the second furrow closer assembly 104. The leading assembly 122 may be positioned ahead of the furrow opener assembly 102 in the forward direction F such that the furrow opener assembly 102 is behind the leading assembly 103. As will be described in further detail below, at least one embodiment of the trailing assembly 100 may include a parallel linkage securing the leading assembly 122 to the trailing assembly 100. In at least one embodiment, the leading assembly 122 is secured to the tool bar 75 via a parallel linkage. Alternatively, in at least one embodiment, the leading assembly 122 is secured to the opener assembly frame 108.

Any of the features, components, and/or parts, including the arrangements and configurations thereof shown in FIGS. 1-2 may be included, either alone or in any combination, in any of the other examples of devices, features, components, and parts shown in the other figures. Likewise, any of the features, components, and/or parts, including the arrangements and configurations thereof shown in the other figures may be included, either alone or in any combination, in the example of the devices, features, components, and parts shown in FIGS. 1-2.

Figure 3A:
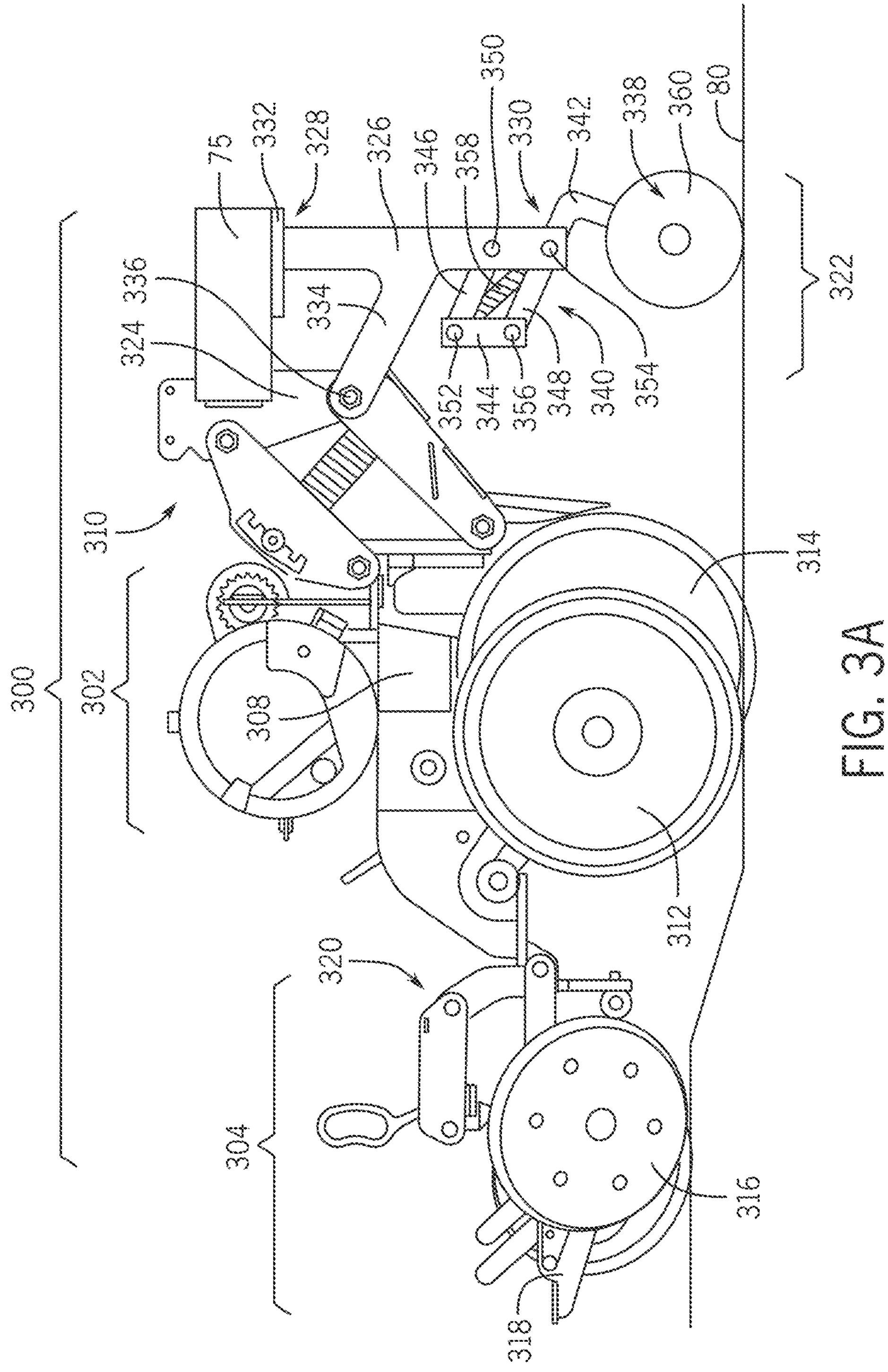
FIG. 3A illustrates a side view of an embodiment of a trailing assembly.

FIG. 3A illustrates a side view of an embodiment of a trailing assembly 300, including a leading assembly 322, a furrow opener assembly 302, and a furrow closer assembly 304. In at least one embodiment, the furrow opener assembly 302 may be secured to a tool bar 75 via a first parallel linkage 310. The parallel linkage 310 may include a set of parallel links rotatably secured to and extending from a first bracket 324 secured to the tool bar 75. In some embodiments, the parallel links of the first parallel linkage 310 are rotatably secured directly to the tool bar 75. The first parallel linkage 310 may also be secured to a opener assembly frame 308 such that the opener assembly frame 308, as well as any opener components of the furrow opener assembly 302 secured thereto, may translate up and down relative to the tool bar 75 as the parallel links rotate. In this way, in at least one embodiment, a guide wheel 312 and an opener disc 314 interacting or contacting the field surface 80 during use may accommodate rough terrain and maintain a proper depth of the opener disc 314 extending into the field to form or open a furrow.

In at least one embodiment, the furrow opener assembly 302 is disposed behind or "rearward" from the tool bar 75. In at least one embodiment, the furrow closer assembly 304 may be secured behind the furrow opener assembly 302. For example, a second parallel linkage 320 may secure the furrow closer frame 318 to the furrow opener frame 308. In this way, the furrow closer assembly 304 and components thereof, including the furrow closer frame 318 and one or more furrow closer discs 316, may translate vertically relative to the furrow opener assembly 302 as the trailing assembly 300 is moved forward over the field surface 80.

In at least one example, a leading assembly 322 may be secured to the trailing assembly 300 ahead of the furrow opener assembly 302 such that the furrow opener assembly 302 trails behind the leading assembly 322 as the agricultural planter 70, including the trailing assembly 300, is pulled in the forward direction F by the agricultural tractor 50 as shown in FIGS. 1 and 2. In this way, the furrow opener frame 308 may be a first frame, the furrow closer frame 318 may be a second frame, and the leading assembly 322 may include a third frame 342 or arm. In such an embodiment, the second frame is configured to trail behind the first frame and the third frame is configured to lead in front or ahead of the first frame.

In at least one embodiment, the leading assembly 322 may include a support frame 326 having a first end 328 and a second end 330. The first end 328 may be attachable to the tool bar 75. In at least one example, the first end 328 of the support frame 326 is attachable to the tool bar 75 via an attachment bracket 332 bolted, welded, or otherwise mechanically secured to the tool bar 75. The second end 330 of the support frame 326 may be opposite the first end 328. In at least one embodiment, the leading assembly 322 may include a parallel linkage 340 secured to the support frame 326 at or near the second end 330 of the support frame 326. In at least one embodiment, the parallel linkage 340 may include first and second parallel links 346 and 348 rotatably secured to the second end 330 of the support frame 326 and a bracket 344. In at least one embodiment, a first upper parallel link 346 may be rotatably secured to the bracket 344 at a first pivot or pivot point 352 and to the support frame 326 at a second pivot or pivot point 350. The second lower parallel link 348 may be rotatably secured to the bracket 344 at a third pivot or pivot point 356 and to the support frame 326 at a fourth pivot or pivot point 354. In at least one embodiment, the first and second parallel links 346, 347 extend back and rearward from the support frame 326.

In at least one embodiment, a support arm 334 may extend rearward from the support frame 326 between the first end 328 and the second end 330 of the support frame 326. The support arm 334 may be configured to fix the support frame 326 to the furrow opener assembly 302 secured to the tool bar 75 and disposed behind the leading assembly 322. In at least one embodiment, the support arm 334 extends rearward to secure to the first bracket 324 of the first parallel linkage 310. In at least one embodiment, the support arm 334 of the support frame 326 may rigidly or fixedly secure the support frame 326 and thus the leading assembly 322, to the trailing assembly 300. In at least one example, the support arm 334 may be secured or attached to the first bracket 324 of the first parallel linkage 310 at a pivot point 336 shared by the lower parallel link of the parallel linkage 310. The lower parallel link may rotate relative to the first bracket 324 at the pivot point 336 while the support arm 334 is fixed relative to the first bracket 324 at the pivot point 336.

An arm or frame 342 of the leading assembly 322 may be secured to the support frame 326 via the parallel linkage 340. In at least one embodiment, as shown in FIG. 3A, the frame 342 may include or be an extension of the second lower link 348 of the parallel linkage 340 of the leading assembly 322 rotating relative to the support frame 326 about the fourth pivot point 354. In this way, as the leading assembly frame 342 rotates vertically upward about the fourth pivot point 354, the bracket 344 of the parallel linkage 340 of the leading assembly 322 moves down vertically.

In at least one example, the leading assembly 322 includes a row cleaner assembly 338 secured to the frame 342. The row cleaner 338 may include a row cleaner wheel 360 rotatably secured to the arm or frame 342 of the leading assembly 322. In such an embodiment, the leading assembly 322 may be referred to as a row cleaner assembly and the frame 342 may be referred to as a row cleaner arm. The row cleaner wheel 360 may include features to clear debris from the field surface 80 before the guide wheel 312 and opener disc 314 encounter the field surface 80. In this way, the row cleaner wheel 360 prepares the field surface 80 so that the guide wheel 312 and opener disc 314 may function to set a constant depth of the furrow being created by the furrow opener assembly 302. The row cleaner wheel 360 may move vertically up and down along the field surface 80 due to the articulation of the parallel linkage 340 as the row cleaner wheel 360 encounters uneven terrain.

In at least one embodiment, the parallel linkage 340 of the leading assembly may include a down force mechanism 358 having a first end and a second end opposite the first end. In at least one embodiment, the down force mechanism 358 may extend and be secured between the first upper link 346 at or near the first pivot point 352 at the first end of the down force mechanism 358 and the second end 330 of the support frame 326 at or near the fourth pivot point 354 at the second end of the down force mechanism 358. The down force mechanism 358 may include an adjustable biasing member, which may bias the parallel linkage 340 toward a position or configuration causing the row cleaner wheel 360 downward against the field surface 80. The down force created by the down force mechanism 358 may be adjustable to create sufficient down force of the row cleaner wheel 360 against the field surface 80 to prevent the row cleaner wheel 360 from bouncing off the field surface 80 during use.

Figure 3B:
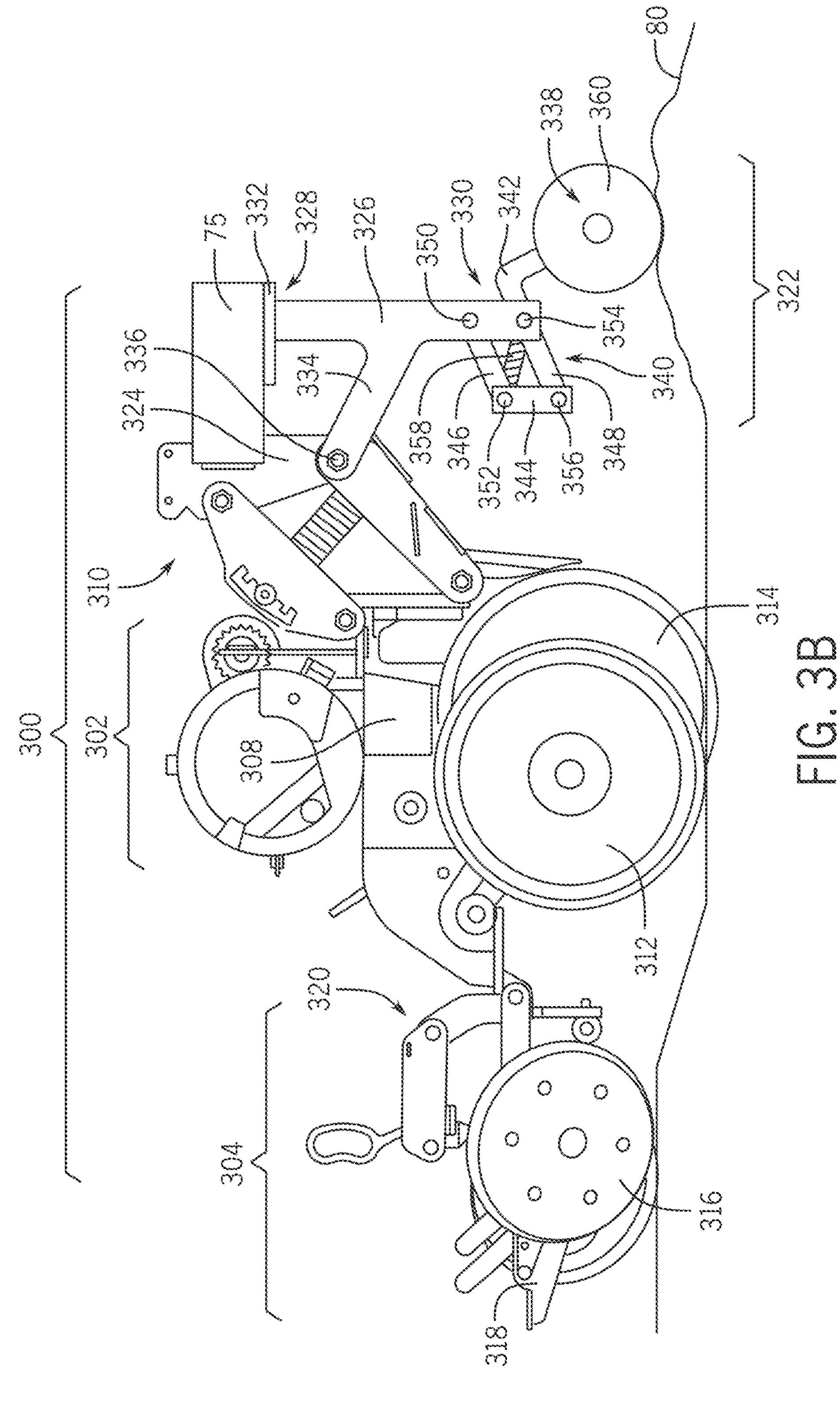
FIG. 3B illustrates another side view thereof on an uneven field surface.

FIG. 3B illustrates the embodiment of the trailing assembly 300 shown in FIG. 3A but where the row cleaner wheel 360 contacting a raised portion of the field surface 80. In the illustrated example, the guide wheel 312 has not yet reached the raised portion of the field surface 80 but remains against the surface 80 behind the row cleaner wheel 360. In at least one embodiment, the parallel linkage 340 of the leading assembly 322 enables the row cleaner wheel 360 to articulate vertically along with the field surface 80 independently of the furrow opener assembly 302 and the furrow closer assembly 304. As shown, when the row cleaner wheel 360 is raised by the field surface 80, the row cleaner arm or frame 342, as a part of or an extension of lower parallel link 348 of the parallel linkage 340, rotates about the fourth pivot point 354 and the bracket 344 lowers. The articulation of these components of the parallel linkage 340 enables the row cleaner wheel 360 to maintain contact with the field surface 80 during use independently from the guide wheel 312 and the opener disc 314 of the furrow opener assembly 302 and independently from the closer disc 316 of the furrow closer assembly 304. In this way, the row cleaner wheel 360 may effectively clear debris in front of the furrow opener and closer assemblies 302, 304 over rough or uneven terrain encountered by the leading assembly 322 ahead of the other components of the trailing assembly 300. In this way, the row cleaner wheel 360 and leading assembly 322 prepares the field surface 80 for consistent and effective furrow opening, closing, and seed planting on cleared ground by the furrow opener and closer assemblies 302, 304.

Figure 3C:
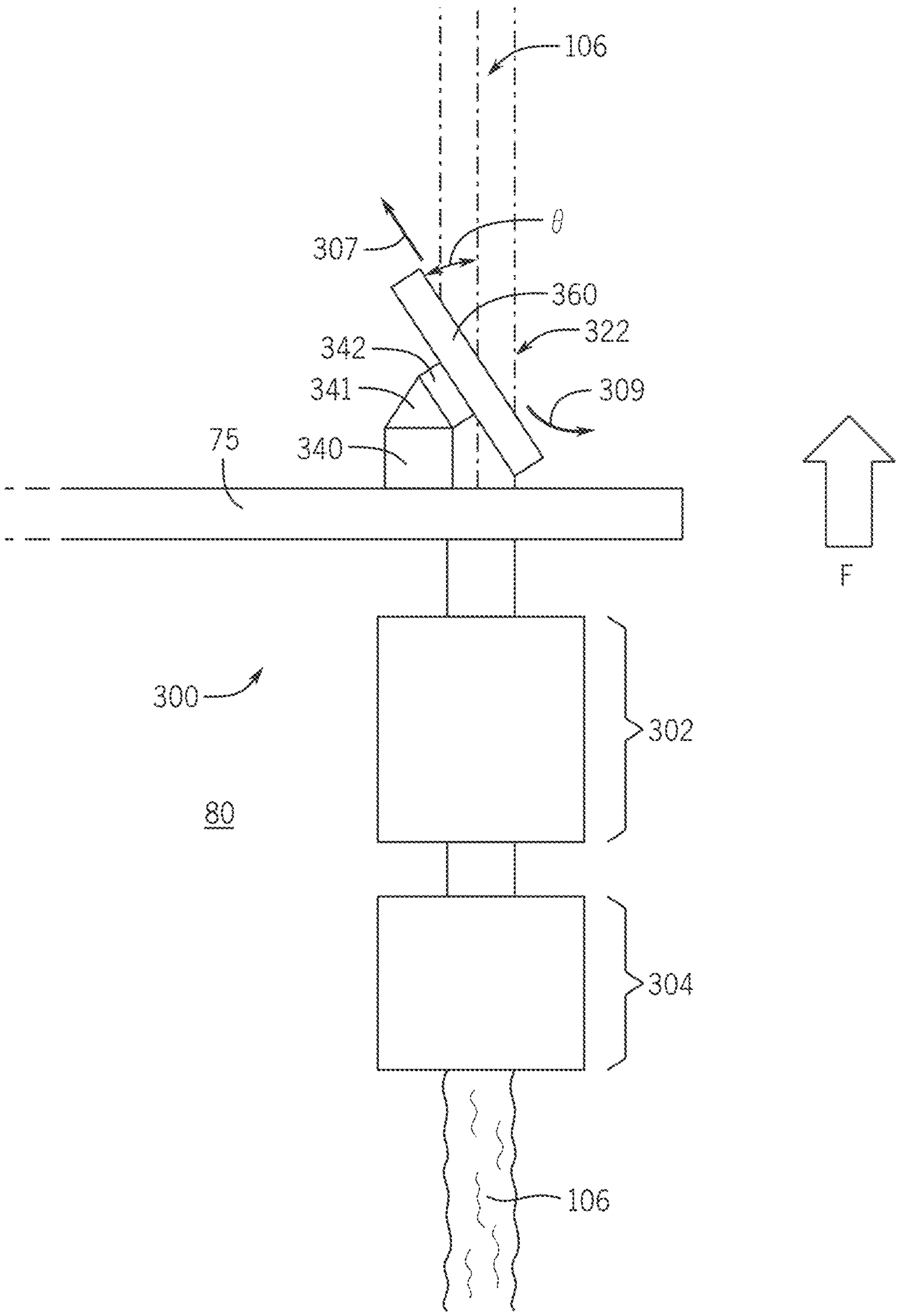
FIG. 3C illustrates a top view of an embodiment of a trailing assembly.

FIG. 3C shows a top view of the trailing assembly 300 shown in FIGS. 3A and 3B, which includes the furrow opener and closer assemblies 302, 304 secured to and trailing the tool bar 75. The leading assembly 322 is also shown attached to the tool bar 75 and positioned in front of the furrow opener assembly 302. In at least one embodiment, the leading assembly 322 may include a parallel linkage 340 securing the frame 342 and row cleaner wheel 360 to the tool bar 75. In at least one embodiment, the frame 342 may be secured to the parallel linkage 340 by an angled bracket hitch mechanism 341. The angled bracket 342 may be oriented to dispose the row cleaner wheel at an angle θ relative to the forward direction F of the trailing assembly 300.

FIG. 3C illustrates a furrow 106 extending in the forward direction F. The furrow 106 is shown in dotted lines in front of the leading assembly 322 to indicate an estimated or planned position of the furrow 106, which as shown in solid lines trailing behind the furrow closer assembly 304 after the furrow 106 has been opened by the furrow opener assembly 302 and closed by the furrow closer assembly 304. The leading assembly 322 may be positioned as shown to operate the row cleaner wheel 360 in contact with the field surface, or in contact with debris covering the field surface, directly in front of where the furrow 106 is formed starting with the furrow opener assembly 302 when the trailing assembly 300 is pulled in the forward direction F.

In at least one embodiment, the frame 342 may be secured to the parallel linkage 340, including to a bracket thereof, via the angled bracket 341. The angled bracket 341 may include a hitch receiver and the frame 342 may include a hitch secured to or within the hitch receiver. In at least some embodiments, the angled bracket 341 may be a triangle hitch. In some examples, the angled bracket 341 may secure the frame 342 and row cleaner wheel 360 at the angle θ relative to the forward direction F and therefore relative to the furrow 106. The row cleaner wheel 360 may be positioned to contact field debris as the row cleaner wheel 360 is rotated and pulled in the forward direction F during use. In some embodiments, the row cleaner wheel may include outwardly extending tines, teeth, or other features configured to sweep debris on the surface of the field 80 away from the area where the furrow 106 is to be formed ahead of the furrow opener assembly 302.

In some embodiments, as the row cleaner wheel 360 rotates, the row cleaner wheel 360 may sweep away the debris in either a first direction 307 away from the designated area of the furrow 106 or in a second direction 309 away from the designated area of the furrow 106, depending on the direction of rotation of the row cleaner wheel 360. The angle θ of the row cleaner wheel 360 can vary so far as a direction of the debris swept away by the row cleaner wheel 360 maintains a lateral component away from the furrow 106 or designated furrow area. In some embodiments, the angle θ may be between 0 and 180-degrees. In at least some embodiments, the row cleaner wheel 360 may be mounted to another portion or surface of the angled bracket 341 such that the row cleaner wheel 360 extends to the left (rather than to the right as shown in FIG. 3C) relative to the angled bracket 341.

The leading assembly 322 may be positioned in front of the furrow opener assembly 302 and the row cleaner wheel 360 may be angled as shown and described herein such that debris present on the surface of the field 80 may be swept away to prepare the surface for the furrow opener assembly 302 and the furrow closer assembly 304 to open and close the furrow 106, respectively, without variations or abnormalities on the surface that would otherwise be due to the presence of debris. Debris may include clods, stubble, old furrows from previous harvests, and so forth, which have not been cleared from the field prior to planting.

Any of the features, components, and/or parts, including the arrangements and configurations thereof shown in FIGS. 3A-3C may be included, either alone or in any combination, in any of the other examples of devices, features, components, and parts shown in the other figures. Likewise, any of the features, components, and/or parts, including the arrangements and configurations thereof shown in the other figures may be included, either alone or in any combination, in the example of the devices, features, components, and parts shown in FIGS. 3A-3C.

Figure 4A:
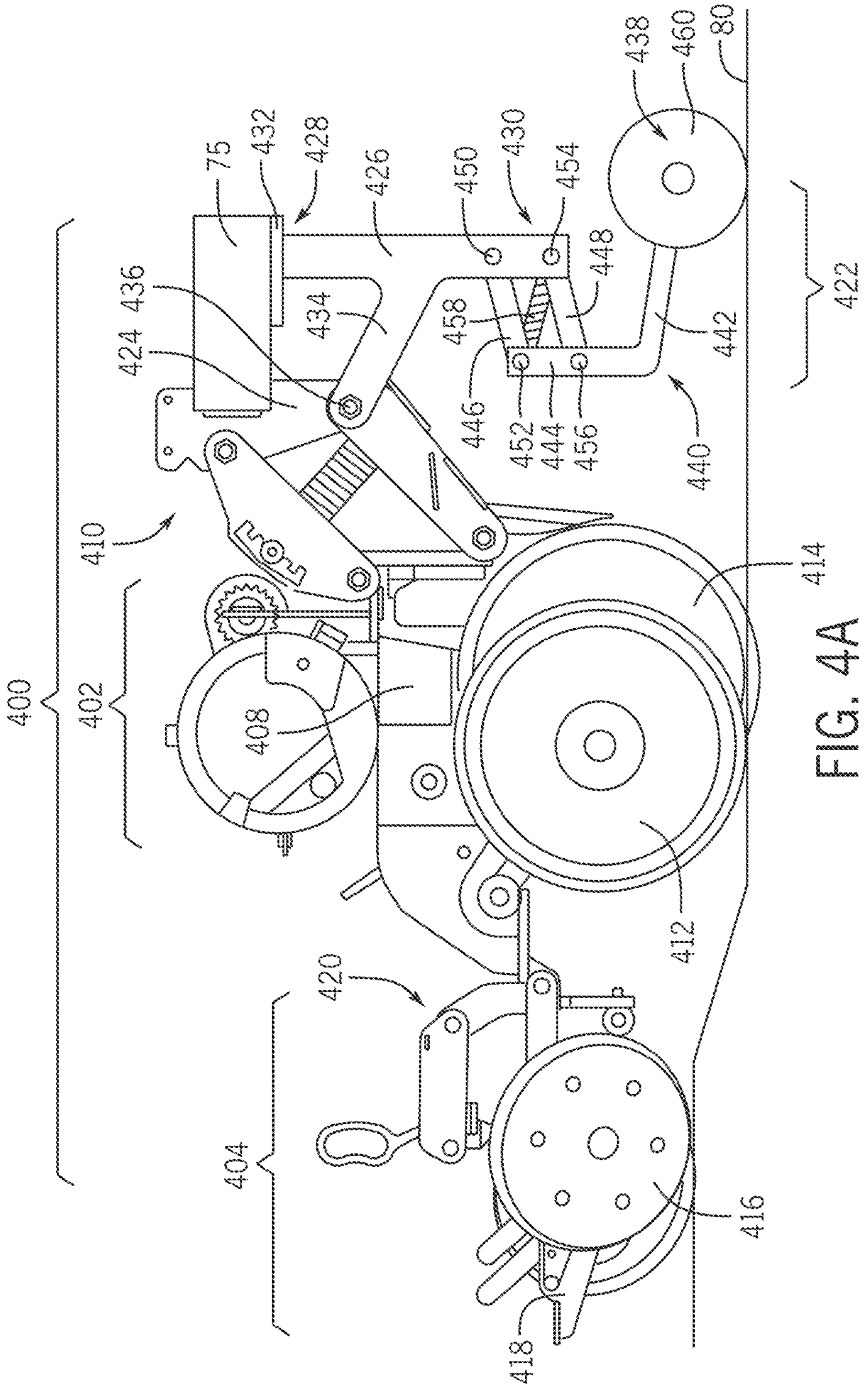
FIG. 4A illustrates a side view of an embodiment of a trailing assembly.

FIG. 4A illustrates another embodiment of a trailing assembly 400 including a furrow opener assembly 402 secured to and behind a tool bar 75 via a first parallel linkage 410 and a furrow closer assembly 404 trailing behind and secured to the furrow opener assembly 402 via a second parallel linkage 420. The first parallel linkage 410 may include a bracket 424 secured to the tool bar 75. In at least one embodiment, the furrow opener assembly 402 includes a furrow opener frame 408, a guide wheel 412 rotatably secured to the furrow opener frame 408, and an opener disc 414 rotatably secured to the furrow opener frame 408. In at least one embodiment, the furrow closer assembly 404 includes a furrow closer frame 418 and a closer disc 416 rotatably coupled to the furrow closer frame 418.

In at least one embodiment, the trailing assembly 400 may also include a leading assembly 422 having a support frame 426 attached to the tool bar 75 at a first end 428 and attached to a row cleaner assembly 438 at a second end 430 via a parallel linkage 440. The leading assembly 422 may also be referred to as a row cleaner assembly and may be disposed forward relative to the furrow opener assembly 402 and the furrow closer assembly 404. The leading assembly 422 may include a support arm 434 extending rearward and away from the support frame 426 to connect the support frame 426 to the first bracket 424 at a point shared by the pivot point 436.

In at least one embodiment, the parallel linkage 440 may include first and second parallel links 446 and 448 rotatably secured to the second end 430 of the support frame 426 and a bracket 444. In at least one embodiment, a first upper parallel link 446 may be rotatably secured to the bracket 444 at a first pivot or pivot point 452 and to the support frame 426 at a second pivot or pivot point 450. The second lower parallel link 448 may be rotatably secured to the bracket 444 at a third pivot or pivot point 456 and to the support frame 426 at a fourth pivot or pivot point 454. In at least one embodiment, the first and second parallel links 446, 447 extend back and rearward from the support frame 426. The parallel linkage 440 may also include a down force mechanism 458 similar to the down force mechanism 358 shown in FIGS. 3A and 3B.

In at least one embodiment, the leading assembly 422 may include a row cleaner arm or frame 442 securing a row cleaner assembly 438 to the parallel linkage 440. The row cleaner frame 442 may extend from or be an extension of the bracket 444 of the linkage 440. In at least one embodiment, the row cleaner frame 442 extends downward and forward from the bracket 444. In one or more other embodiments, the row cleaner frame 442 may extends downward and rearward or just downward from the bracket 444. In any case, the row cleaner assembly 438 may include a row cleaner wheel 460 rotatably secured to the row cleaner frame 442. The row cleaner wheel 460 may be disposed forward relative to the guide wheel 412 and the opener disc 414.

Figure 4B:
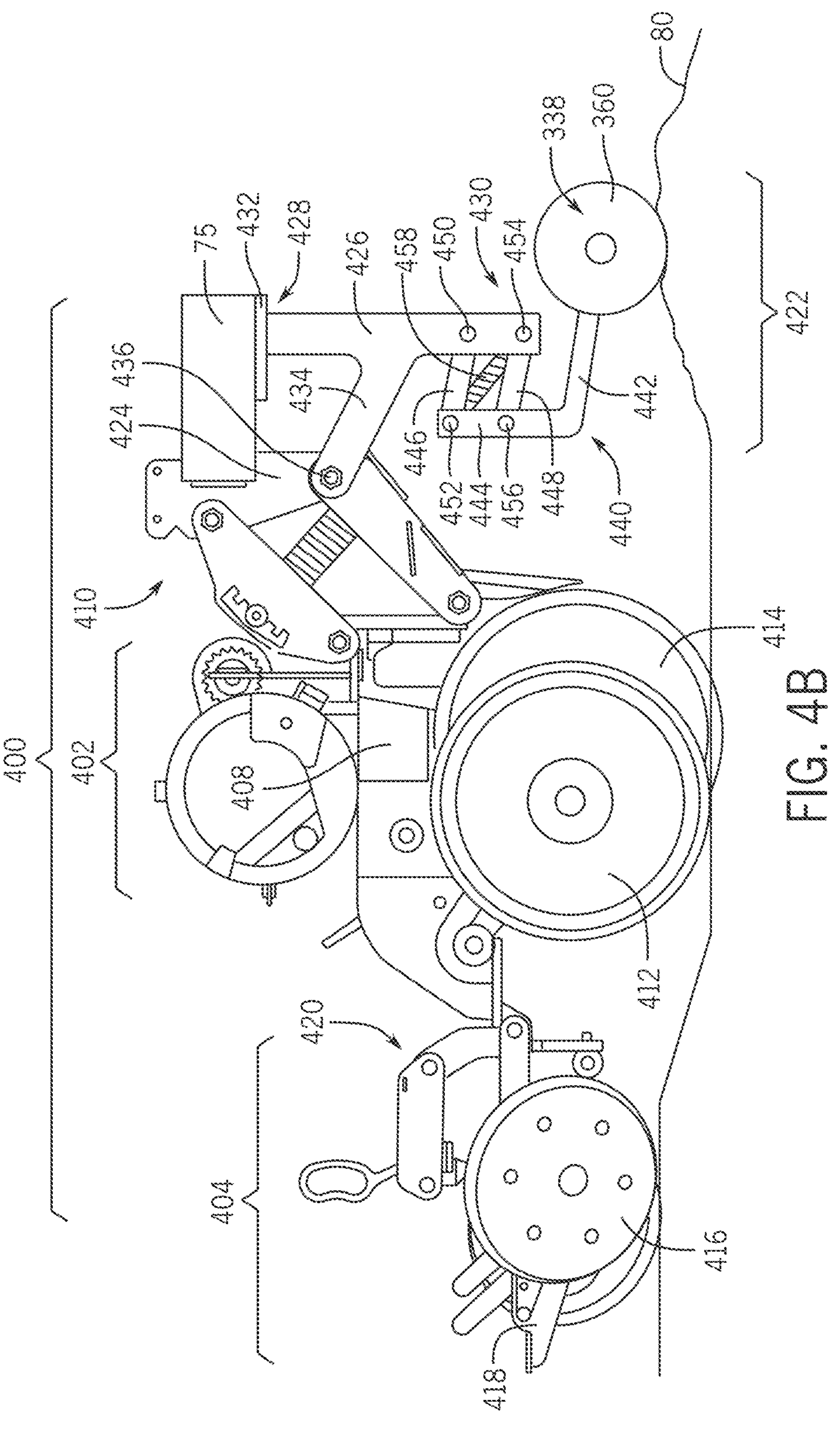
FIG. 4B illustrates another side view thereof on an uneven field surface.

FIG. 4B illustrates the embodiment of the trailing assembly 400 shown in FIG. 4A but where the row cleaner wheel 460 contacting a raised portion of the field surface 80. In the illustrated example, the guide wheel 412 has not yet reached the raised portion of the field surface 80 but remains against the surface 80 behind the row cleaner wheel 460. In at least one embodiment, the parallel linkage 440 of the leading assembly 422 enables the row cleaner wheel 460 to articulate vertically along with the field surface 80 independently of the furrow opener assembly 402 and the furrow closer assembly 404. As shown, when the row cleaner wheel 460 is raised by the field surface 80, the row cleaner arm or frame 442, as a part of or an extension of lower parallel link 448 of the parallel linkage 440, moves up and down with the bracket 444. The articulation of these components of the parallel linkage 440 enables the row cleaner wheel 460 to maintain contact with the field surface 80 during use independently from the guide wheel 412 and the opener disc 414 of the furrow opener assembly 402 and independently from the closer disc 416 of the furrow closer assembly 404. In this way, the row cleaner wheel 460 may effectively clear debris in front of the furrow opener and closer assemblies 402, 404 over rough or uneven terrain encountered by the leading assembly 422 ahead of the other components of the trailing assembly 400. In this way, the row cleaner wheel 460 and leading assembly 422 prepares the field surface 80 for consistent and effective furrow opening, closing, and seed planting on cleared ground by the furrow opener and closer assemblies 402, 404.

Any of the features, components, and/or parts, including the arrangements and configurations thereof shown in FIGS. 4A-4B may be included, either alone or in any combination, in any of the other examples of devices, features, components, and parts shown in the other figures. Likewise, any of the features, components, and/or parts, including the arrangements and configurations thereof shown in the other figures may be included, either alone or in any combination, in the example of the devices, features, components, and parts shown in FIGS. 4A-4B.

Figure 5A:
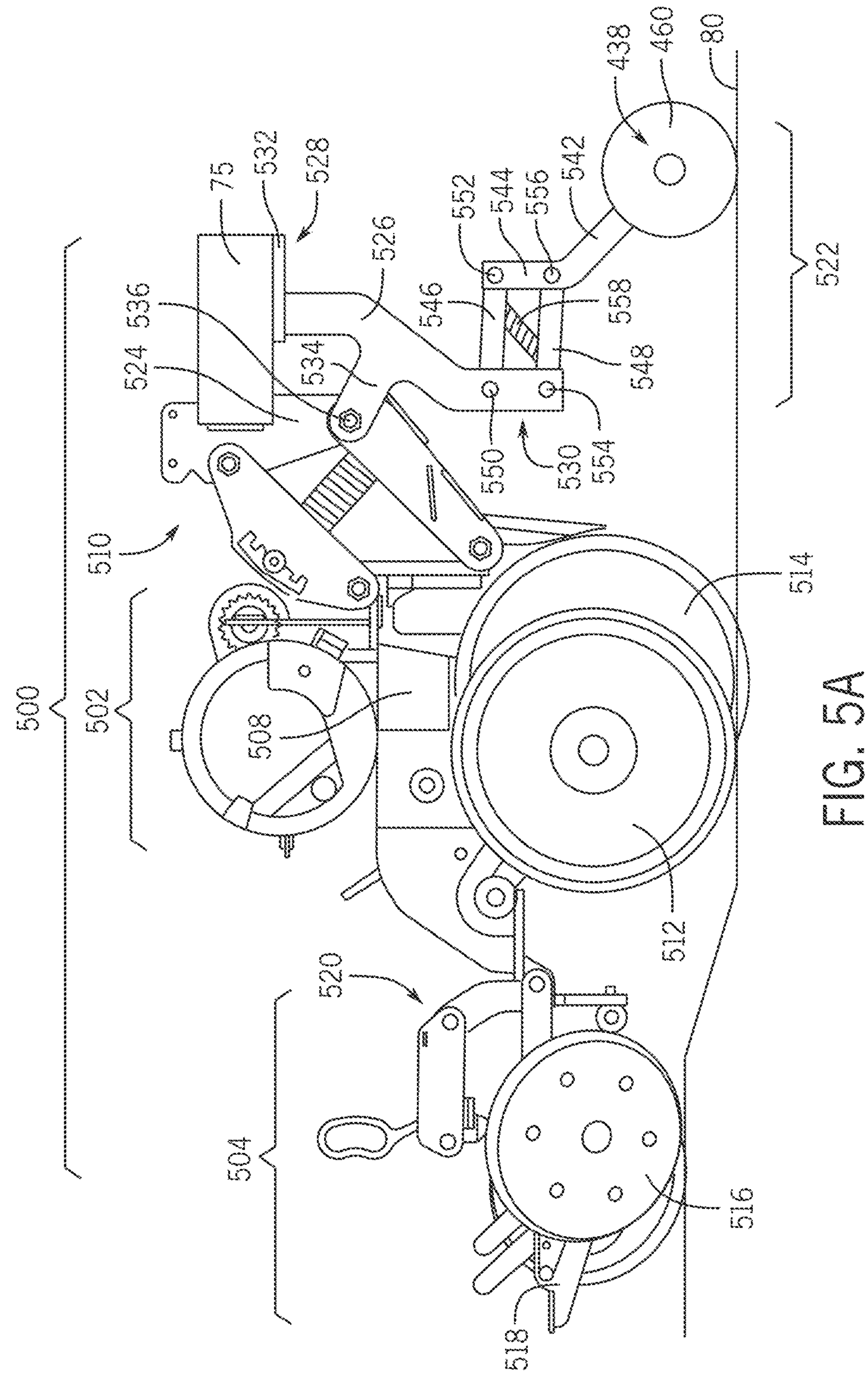
FIG. 5A illustrates a side view of an embodiment of a trailing assembly.

FIG. 5A illustrates another embodiment of a trailing assembly 500 including a furrow opener assembly 502 secured to and behind a tool bar 75 via a first parallel linkage 510 and a furrow closer assembly 504 trailing behind and secured to the furrow opener assembly 502 via a second parallel linkage 520. The first parallel linkage 510 may include a bracket 524 secured to the tool bar 75. In at least one embodiment, the furrow opener assembly 502 includes a furrow opener frame 508, a guide wheel 512 rotatably secured to the furrow opener frame 508, and an opener disc 514 rotatably secured to the furrow opener frame 508. In at least one embodiment, the furrow closer assembly 504 includes a furrow closer frame 518 and a closer disc 516 rotatably coupled to the furrow closer frame 518.

In at least one embodiment, the trailing assembly 500 may also include a leading assembly 522 having a support frame 526 attached to the tool bar 75 at a first end 528 and attached to a row cleaner assembly 538 at a second end 530 via a parallel linkage 540. The leading assembly 522 may also be referred to as a row cleaner assembly and may be disposed forward relative to the furrow opener assembly 502 and the furrow closer assembly 504. The leading assembly 522 may include a support arm 534 extending rearward and away from the support frame 526 to connect the support frame 526 to the first bracket 524 at a point shared by the pivot point 536.

In at least one embodiment, the parallel linkage 540 may include first and second parallel links 546 and 548 rotatably secured to the second end 530 of the support frame 526 and a bracket 544. In at least one embodiment, a first upper parallel link 546 may be rotatably secured to the bracket 544 at a first pivot or pivot point 552 and to the support frame 526 at a second pivot or pivot point 550. The second lower parallel link 548 may be rotatably secured to the bracket 544 at a third pivot or pivot point 556 and to the support frame 526 at a fourth pivot or pivot point 554. In at least one embodiment, the first and second parallel links 546, 547 extend ahead and forward from the support frame 526. The parallel linkage 540 may also include a down force mechanism 558 similar to the down force mechanism 358 shown in FIGS. 3A and 3B.

In at least one embodiment, the leading assembly 522 may include a row cleaner arm or frame 542 securing a row cleaner assembly 538 to the parallel linkage 540. The row cleaner frame 542 may extend from or be an extension of the bracket 544 of the linkage 540. In at least one embodiment, the row cleaner frame 542 extends downward and forward from the bracket 544. In one or more other embodiments, the row cleaner frame 542 may extends downward and rearward or just downward from the bracket 544. In any case, the row cleaner assembly 538 may include a row cleaner wheel 560 rotatably secured to the row cleaner frame 542. The row cleaner wheel 560 may be disposed forward relative to the guide wheel 512 and the opener disc 514.

Figure 5B:
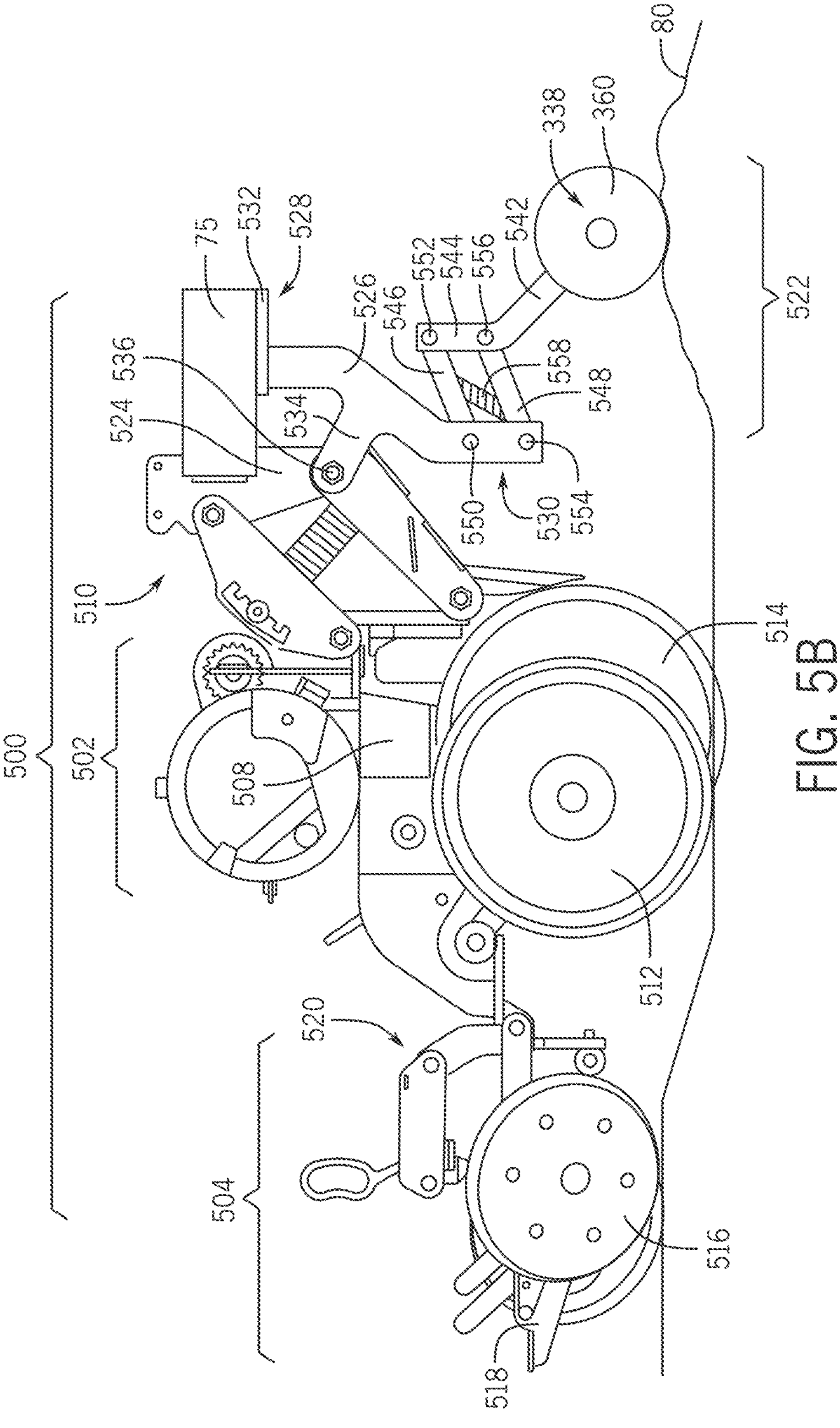
FIG. 5B illustrates another side view thereof on an uneven field surface.

FIG. 5B illustrates the embodiment of the trailing assembly 500 shown in FIG. 5A but where the row cleaner wheel 560 contacting a raised portion of the field surface 80. In the illustrated example, the guide wheel 512 has not yet reached the raised portion of the field surface 80 but remains against the surface 80 behind the row cleaner wheel 560. In at least one embodiment, the parallel linkage 540 of the leading assembly 522 enables the row cleaner wheel 560 to articulate vertically along with the field surface 80 independently of the furrow opener assembly 502 and the furrow closer assembly 504. As shown, when the row cleaner wheel 560 is raised by the field surface 80, the row cleaner arm or frame 542, as a part of or an extension of lower parallel link 548 of the parallel linkage 540, moves up and down with the bracket 544. The articulation of these components of the parallel linkage 540 enables the row cleaner wheel 560 to maintain contact with the field surface 80 during use independently from the guide wheel 512 and the opener disc 514 of the furrow opener assembly 502 and independently from the closer disc 516 of the furrow closer assembly 504. In this way, the row cleaner wheel 560 may effectively clear debris in front of the furrow opener and closer assemblies 502, 504 over rough or uneven terrain encountered by the leading assembly 522 ahead of the other components of the trailing assembly 500. In this way, the row cleaner wheel 560 and leading assembly 522 prepares the field surface 80 for consistent and effective furrow opening, closing, and seed planting on cleared ground by the furrow opener and closer assemblies 502, 504.

Any of the features, components, and/or parts, including the arrangements and configurations thereof shown in FIGS. 5A-5B may be included, either alone or in any combination, in any of the other examples of devices, features, components, and parts shown in the other figures. Likewise, any of the features, components, and/or parts, including the arrangements and configurations thereof shown in the other figures may be included, either alone or in any combination, in the example of the devices, features, components, and parts shown in FIGS. 5A-5B.

Figure 6:
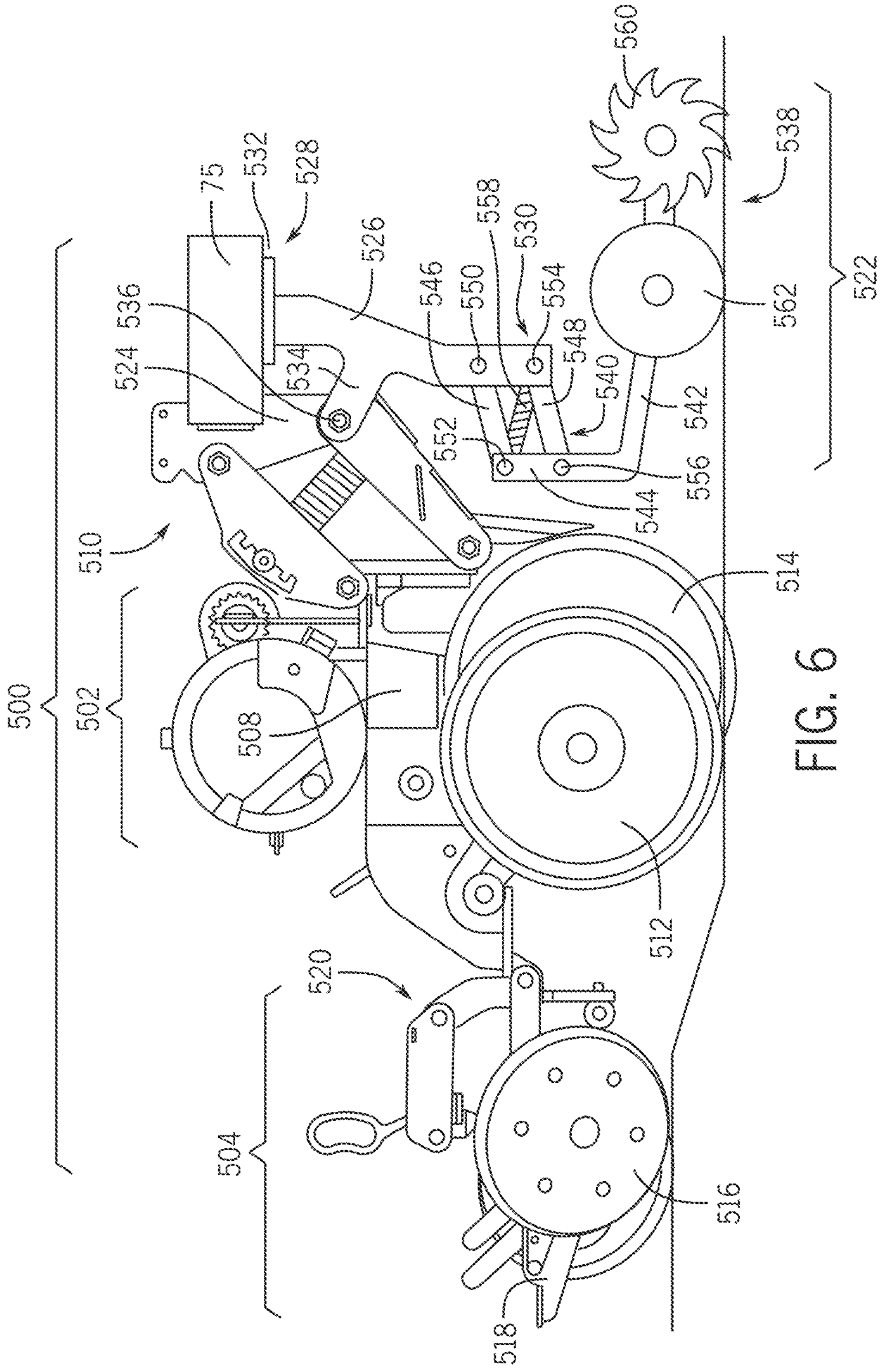
FIG. 6 illustrates a side view of an embodiment of a trailing assembly.

FIG. 6 illustrates another embodiment of the trailing assembly 500 including the furrow opener assembly 502 and furrow closer assembly 504 shown in FIGS. 5A and 5B. In the embodiment shown in FIG. 6, the leading assembly 522 may include a depth control wheel 560 rotatably attached to the row cleaner arm or frame 542 in addition to the row cleaner wheel 560 rotatably attached to the row cleaner arm or frame 542. In one or more other embodiments, the row cleaner assembly 538 may include any number or combination of row cleaner components, including various row cleaner wheels, discs, depth control wheels, and so forth. In at least one embodiment, the various components of the row cleaner assembly 538 may be removably attached to the row cleaner frame 542 so a user may customize the row cleaner assembly 538 to the user's preferences and needs based on soil and field conditions.

Any of the features, components, and/or parts, including the arrangements and configurations thereof shown in FIG. 6 may be included, either alone or in any combination, in any of the other examples of devices, features, components, and parts shown in the other figures. Likewise, any of the features, components, and/or parts, including the arrangements and configurations thereof shown in the other figures may be included, either alone or in any combination, in the example of the devices, features, components, and parts shown in FIG. 6.

Figure 7:
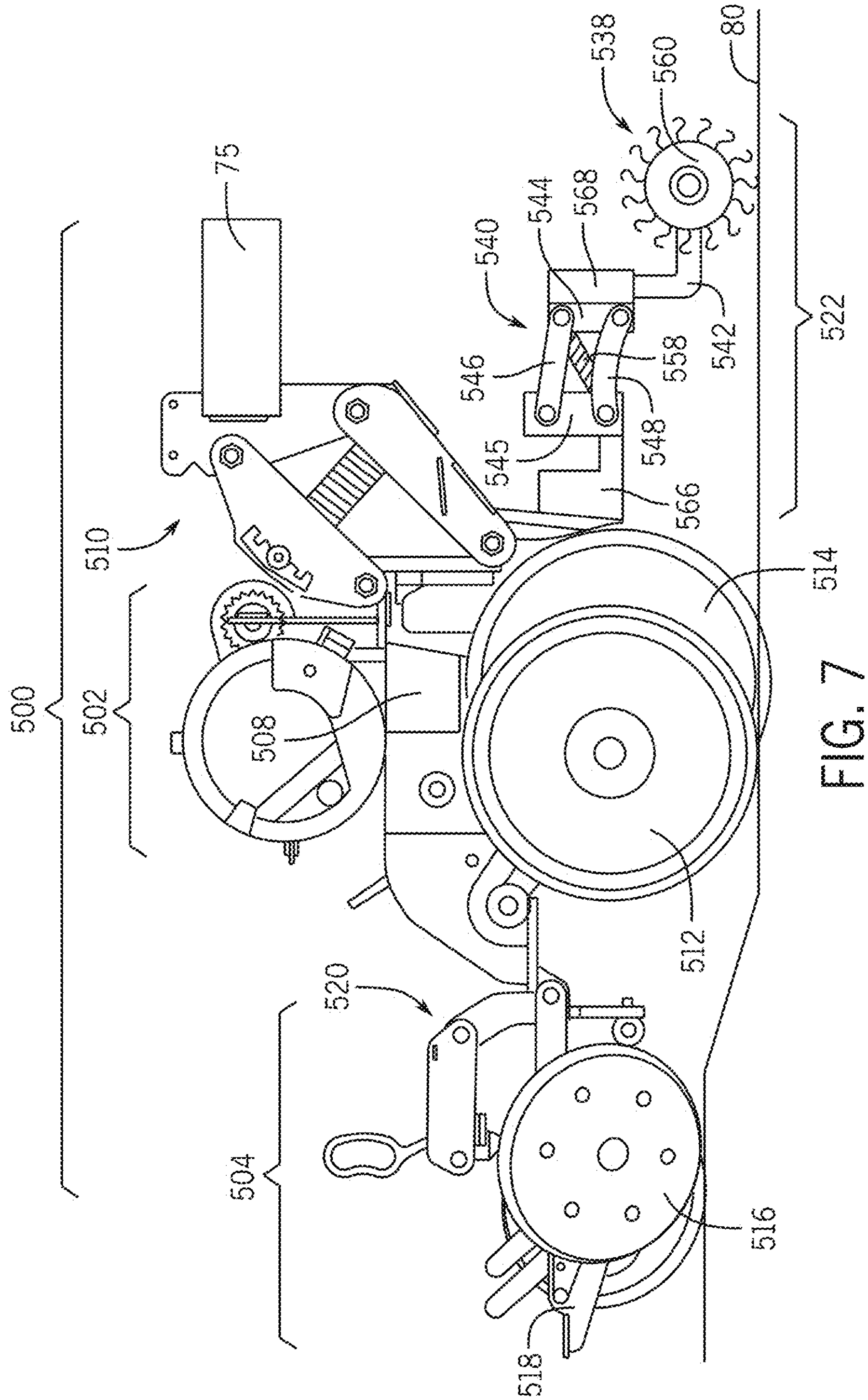
FIG. 7 illustrates a side view of an embodiment of a trailing assembly.

FIG. 7 illustrates another embodiment of the trailing assembly 500 shown in other figures but where the leading assembly 522 is secured directly to the furrow opener frame 508 of the furrow opener assembly 502. In the illustrated embodiment of FIG. 7, the arm or frame 542 of the leading assembly 522 is attachable to the furrow opener frame 508 via the parallel linkage 540 shown. In at least one embodiment, the leading assembly 522 includes a front hitch 568 to which the frame 542 may be permanently or removably secured. The front hitch 568 may be secured to a front bracket 544 of the parallel linkage 540.

In at least one embodiment, the parallel links 546, 548 of the parallel linkage 540 may rotatably secure to the rear bracket 545 of the parallel linkage 540 and the rear bracket 545 may be secured to a frame hitch 566 of the furrow opener frame 508. In one or more other embodiments, the frame 542 may be directly secured to the front bracket 544. In one or more embodiments, the rear bracket 545 of the parallel linkage 540 may be directly secured to the furrow opener frame 508. In embodiments where the leading assembly 522 is attached directly to the furrow opener frame 508 rather than to the tool bar 75, as shown in other figures, the row cleaner assembly 538, including the row cleaner wheel 560, may move up and down relative to the field surface 80 via both the first parallel linkage 510 and the parallel linkage 540 of the leading assembly 522.

Any of the features, components, and/or parts, including the arrangements and configurations thereof shown in FIG. 7 may be included, either alone or in any combination, in any of the other examples of devices, features, components, and parts shown in the other figures. Likewise, any of the features, components, and/or parts, including the arrangements and configurations thereof shown in the other figures may be included, either alone or in any combination, in the example of the devices, features, components, and parts shown in FIG. 7.

Figure 8A:
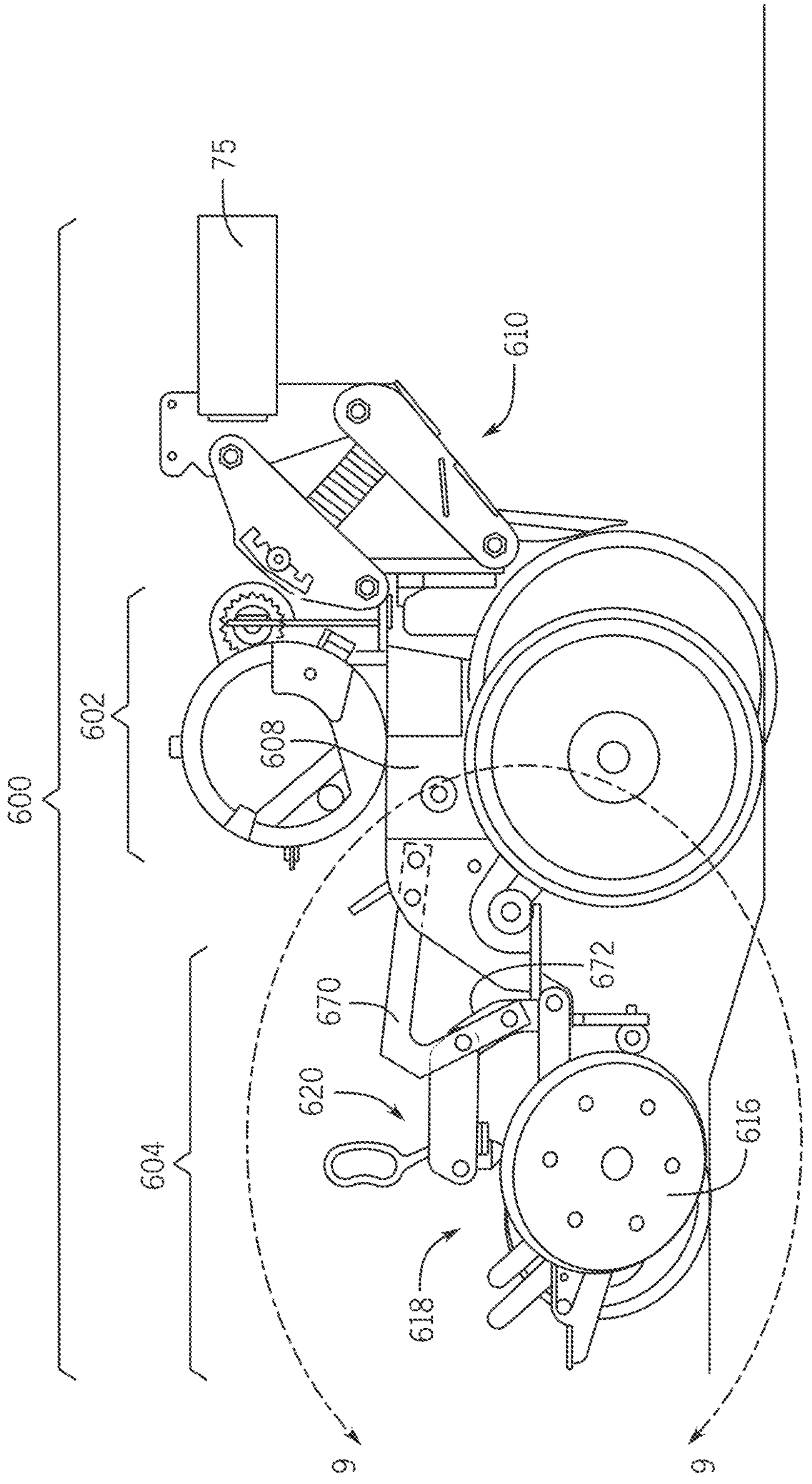
FIG. 8A illustrates a side view of an embodiment of a trailing assembly.

FIG. 8A illustrates another embodiment of a trailing assembly 600, including a furrow opener assembly 602 and a furrow closer assembly 604. The furrow opener assembly 602 may be secured to a tool bar 75 via a first parallel linkage 610 and the furrow closer assembly 604 may be secured to the furrow opener assembly 602, for example to a furrow opener frame 608 of the furrow opener assembly 602, via a second parallel linkage 620. In at least one embodiment, the second parallel linkage 620 includes a linkage bracket 672 fixed to and secured in position relative to the furrow opener frame 608. The second parallel linkage 620 may be secured to a furrow closer frame 618 of the furrow closer assembly 604.

In at least one embodiment, the trailing assembly 600 also includes a support bracket 670 extending between and secured to the furrow opener frame 608 and the linkage bracket 672 of the second parallel linkage 620. The support bracket 670 may structurally strengthen and stiffen a connection between the furrow opener frame 608 and the linkage bracket 672 of the second parallel linkage 620. In at least one embodiment, the support bracket 670 may be a first support bracket on a first side of the trailing assembly 600 and a second support bracket may support the connection between the furrow opener and closer assemblies 602, 604 on an opposite side of the trailing assembly 600. In such an embodiment, the second support bracket may be disposed directly behind the first support bracket 670 and hidden from view thereby in the side view orientation of the trailing assembly 600 shown in FIG. 8A.

Figure 8B:
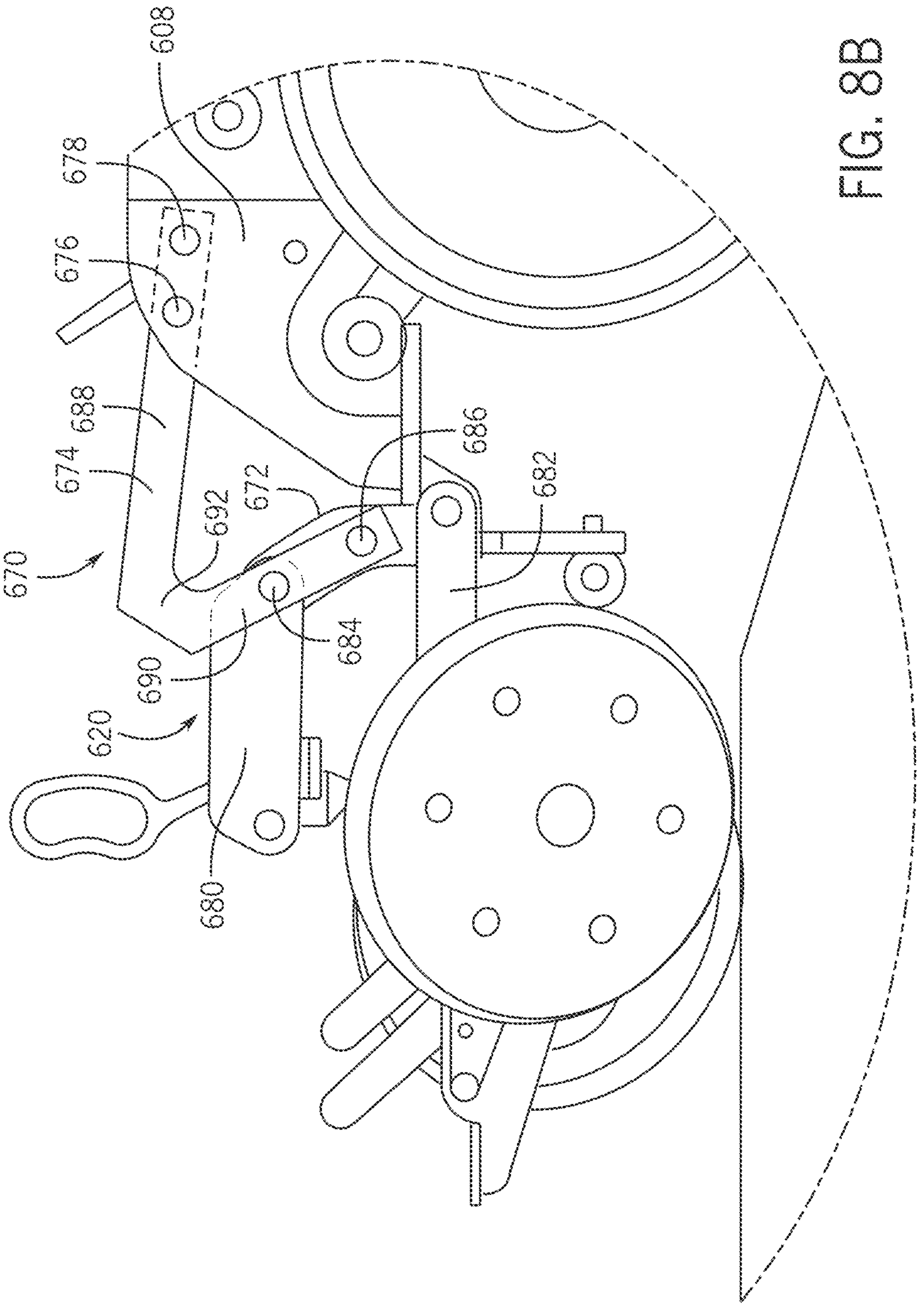
FIG. 8B illustrates a close up view of a portion thereof.

FIG. 8B illustrates a closer view of a portion of the trailing assembly shown in FIG. 8A. In at least one embodiment, the second parallel linkage 620 includes first and second parallel links 680 and 682 rotatably secured to the linkage bracket 672. The linkage bracket 672 is rigidly secured to the furrow opener frame 608. The first parallel link 680 may be rotatably coupled to the linkage bracket 672 at a first pivot or pivot point 684. In at least one embodiment, the support bracket 670 may be rigidly secured to the furrow opener frame 608 at a first mechanical attachment point 676 and a second mechanical attachment point 678. In this way, the support bracket 670 may be rigidly attached to the furrow opener frame 608. In at least one embodiment, the support bracket 670 may be secured to the linkage bracket 672 at a third mechanical attachment point, which may be the same as the first pivot or pivot point 684, and a fourth mechanical attachment point 686 such that the support bracket is rigidly attached to the linkage bracket 672.

In at least one embodiment, the support bracket 670 includes a body 674 having a first arm 688 connected to a second arm 690 at a transition portion 692. The first and second arms 688, 690 may be angled relative to one another. In at least one embodiment, the body 674 of the support bracket 670 is formed as a single, unitary piece. In at least one embodiment, the body 674 of the support bracket 670 may include multiple pieces mechanically secured together, including the first and second arms 688, 690. In at least one embodiment, the body 674 is formed of high strength materials including, but not limited to, metals including steel, cast iron, other metals, hard plastics, carbon fiber, other alloy or mixed materials, or any combination thereof.

Any of the features, components, and/or parts, including the arrangements and configurations thereof shown in FIGS. 8A and 8B may be included, either alone or in any combination, in any of the other examples of devices, features, components, and parts shown in the other figures. Likewise, any of the features, components, and/or parts, including the arrangements and configurations thereof shown in the other figures may be included, either alone or in any combination, in the example of the devices, features, components, and parts shown in FIGS. 8A and 8B.

Although various representative embodiments of this invention have been described above with a certain degree of particularity, those skilled in the art could make numerous alterations to the disclosed embodiments without departing from the spirit or scope of the inventive subject matter set forth in the specification and claims. The various embodiments discussed herein are not exclusive to their own individual disclosures. Each of the various embodiments may be combined with or excluded from other embodiments. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Other examples and implementations are within the scope and spirit of the disclosure and appended claims. For example, features implementing functions may also be physically located at various positions, including being distributed such that portions of functions are implemented at different physical locations. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A row cleaner assembly for an agricultural planter having a tool bar, the row cleaner assembly comprising:
- a support frame having a first end attachable to the tool bar and a second end opposite the first end;
- a parallel linkage secured to the support frame at or near the second end;
- a row cleaner arm secured to the support frame via the parallel linkage; and
- a support arm extending rearward from the support frame between the first end and the second end, the support arm configured to fix the support frame to a furrow opener assembly secured to the tool bar and disposed behind the row cleaner assembly.

2. The row cleaner assembly of claim 1, wherein:
- the parallel linkage is a first parallel linkage; and
- the furrow opener assembly is fixed to the tool bar via a second parallel linkage.

3. The row cleaner assembly of claim 2, wherein:
- the second parallel linkage includes a first bracket secured to the tool bar; and
- the support arm is configured to fix the support frame to the first bracket.

4. The row cleaner assembly of claim 3, wherein:
- the furrow opener assembly includes an opener frame; and
- the second parallel linkage includes a second bracket rotatably secured to the first bracket via parallel links.

5. The row cleaner assembly of claim 1, wherein the row cleaner arm is attachable to a row cleaner wheel.

6. The row cleaner assembly of claim 5, wherein the row cleaner arm is attachable to a depth control wheel.

7. The row cleaner assembly of claim 1, wherein the parallel linkage comprises:
- a bracket;
- a first parallel link rotatably secured to the bracket at a first pivot and to the support frame at a second pivot;
- a second parallel link rotatably secured to the bracket at a third pivot and to the support frame at a fourth pivot; and
- an adjustable biasing member extending from the first parallel link to the support frame.

8. The row cleaner assembly of claim 7, wherein:
- the adjustable biasing member includes a first end and a second end opposite the first end;
- the first end of the adjustable biasing member is secured at or near the first pivot; and
- the second end of the adjustable biasing member is secured at or near the fourth pivot.

9. A trailing assembly of an agricultural planter comprising the row cleaner assembly of claim 1, further comprising:
- the furrow opener assembly including a frame;
- a furrow closer assembly disposed behind the furrow opener assembly;
- a third parallel linkage securing the furrow closer assembly to the furrow opener assembly, the third parallel linkage including a linkage bracket fixed to the frame; and
- a support bracket rigidly secured to the frame and the linkage bracket.

10. The trailing assembly of claim 9, wherein:
- the support bracket is a first support bracket secured to a first side of the frame; and
- the trailing assembly further comprises a second support bracket rigidly secured to
- the linkage bracket and a second side of the frame opposite the first side.

11. The trailing assembly of claim 9, wherein the support bracket comprises:
- a first arm secured to the frame;
- a second arm secured to the linkage bracket; and
- a transition portion between the first arm and the second arm;
- wherein the first arm is angled relative to the second arm.

12. A trailing assembly of an agricultural planter, comprising:
- a first parallel linkage configured to secure a furrow opener assembly behind a tool bar of the agricultural planter; and
- a row cleaner assembly, comprising:
  - a second parallel linkage configured to secure a row cleaner wheel in front of the furrow opener assembly,
  - a support frame having a first end attachable to the tool bar and a second end opposite the first end, the second parallel linkage secured to the support frame at or near the second end,
  - a row cleaner arm secured to the support frame via the second parallel linkage, and
  - a support arm extending rearward from the support frame between the first end and the second end, the support arm configured to fix the support frame to the furrow opener assembly.

13. The trailing assembly of claim 12, wherein the row cleaner arm is configured to rotatably attach to the row cleaner wheel.

14. The trailing assembly of claim 13, wherein:

the row cleaner arm is configured to rotatably attach to a depth control wheel; and the furrow opener assembly includes a furrow opener wheel.

15. The trailing assembly of claim 12, wherein the second parallel linkage is secured to the furrow opener assembly.

16. A trailing assembly, comprising:

a first frame attachable to a tool bar of an agricultural planter via a first parallel linkage;

a second frame attachable to the first frame via a second parallel linkage; and a row cleaner assembly comprising:

a third parallel linkage, a support frame attachable to the tool bar at or adjacent a first end and having a second end opposite the first end, a third frame attachable to the support frame and the trailing assembly via the third parallel linkage, and a support arm extending rearward from the support frame between the first end and the second end, the support arm configured to operatively couple the support frame to the first frame;

wherein:

the second frame is configured to trail behind the first frame; and the third frame is configured to lead ahead of the first frame.

17. The trailing assembly of claim 16, wherein the third frame is operatively attachable to the tool bar of the trailing assembly.

18. The trailing assembly of claim 16, wherein the third frame is attachable to the first frame via the third parallel linkage.

19. The trailing assembly of claim 16, further comprising a furrow opener assembly secured to the first frame.

20. The trailing assembly of claim 19, the furrow opener assembly including a furrow opener disc.

21. The trailing assembly of claim 16, further comprising a closer assembly secured to the second frame.

* * * * *